(12) United States Patent
Cherrington

(10) Patent No.: US 8,628,273 B2
(45) Date of Patent: Jan. 14, 2014

(54) METHOD AND APPARATUS FOR FORCING A PIPELINE INTO OR OUT OF A BOREHOLE

(76) Inventor: Martin Cherrington, Fair Oaks, CA (US)

(*) Notice: Subject to any disclaimer, the term of this patent is extended or adjusted under 35 U.S.C. 154(b) by 0 days.

(21) Appl. No.: 13/560,975

(22) Filed: Jul. 27, 2012

(65) Prior Publication Data

US 2013/0028664 A1    Jan. 31, 2013

Related U.S. Application Data

(60) Provisional application No. 61/513,430, filed on Jul. 29, 2011, provisional application No. 61/619,314, filed on Apr. 2, 2012.

(51) Int. Cl.
*F16L 1/028* (2006.01)

(52) U.S. Cl.
USPC .......................................... 405/184; 254/29 R

(58) Field of Classification Search
USPC ................. 405/184, 174, 154.1; 54/29 R
See application file for complete search history.

(56) References Cited

U.S. PATENT DOCUMENTS

| | | | | |
|---|---|---|---|---|
| 3,726,506 A | * | 4/1973 | Vanderwaal et al. | 254/29 R |
| 3,834,668 A | * | 9/1974 | Casey | 254/29 R |
| 3,871,618 A | | 3/1975 | Funk | |
| 3,881,558 A | * | 5/1975 | Dolza | 405/184 |
| 4,434,969 A | * | 3/1984 | Von Ruden | 254/29 R |
| 4,455,107 A | * | 6/1984 | Schosek | 405/184 |
| 4,746,096 A | * | 5/1988 | Donnell et al. | 254/29 R |
| 4,955,757 A | | 9/1990 | Balling | |
| 5,159,860 A | | 11/1992 | Pietras | |
| 5,303,783 A | | 4/1994 | Begnaud et al. | |
| 5,375,945 A | | 12/1994 | Cherrington | |
| 6,481,930 B2 | * | 11/2002 | Forrest | 405/184 |
| 6,536,539 B2 | | 3/2003 | Merecka et al. | |
| 7,748,471 B2 | | 7/2010 | Osadchuk et al. | |
| 2002/0112890 A1 | | 8/2002 | Wentworth et al. | |
| 2009/0185866 A1 | | 7/2009 | Koegler | |
| 2012/0230771 A1 | * | 9/2012 | Farley et al. | 405/184 |

FOREIGN PATENT DOCUMENTS

| | | |
|---|---|---|
| EP | 0411967 A1 | 2/1991 |
| EP | 0767289 A1 | 4/1997 |
| WO | WO 03/033952 A1 | 4/2003 |
| WO | WO 2011/150341 A2 | 12/2011 |

OTHER PUBLICATIONS http://www.youtube.com/watch?v=X4xhalY20k4; Cherrington Shore Landings, Horizontal Directional Drilling, Mar. 2002, Video Screenshot, 1 sheet.

Coe Drilling Australia, Pty Ltd., Coe Drilling Australia Successfully Completes BASSGAS HDD Shore Crossing, Press Release, Oct. 24, 2003, 2 sheets.

(Continued)

*Primary Examiner* — Frederick L Lagman

(74) *Attorney, Agent, or Firm* — Christie, Parker & Hale, LLP

(57) ABSTRACT

A pipe thrusting apparatus for inserting and removing a pipe from a borehole, comprising a collar configured to releasably grip the pipe; a support frame having at least one anchor securable to the ground; and a bi-directional driver coupled between the collar and the support frame, the driver configured to drive the collar toward and away from the borehole to insert and remove the pipe from the borehole.

30 Claims, 25 Drawing Sheets

(56) References Cited

OTHER PUBLICATIONS

HerrenknechtAG, More Power Reserves for Pipeline Construction, Herenknecht News, 2007, 2 sheets.
Vermeer D500X500 Product Literature, 5 sheets.
http://hydrafabinc.com/#, Pipe Thrust Device Video, Video Screenshot, 1 sheet.
International Search Report dated Apr. 12, 2013 for International Application PCT/US2013/048898, 4 sheets.
International Search Report dated Apr. 12, 2013 for International Application PCT/US2013/048886, 4 sheets.
Photograph of Crane, 1980's.
Photograph of Crane, 1970's.
Photograph of Crane, 1990's.
Photograph of Crane, 1930's-1940's.

\* cited by examiner

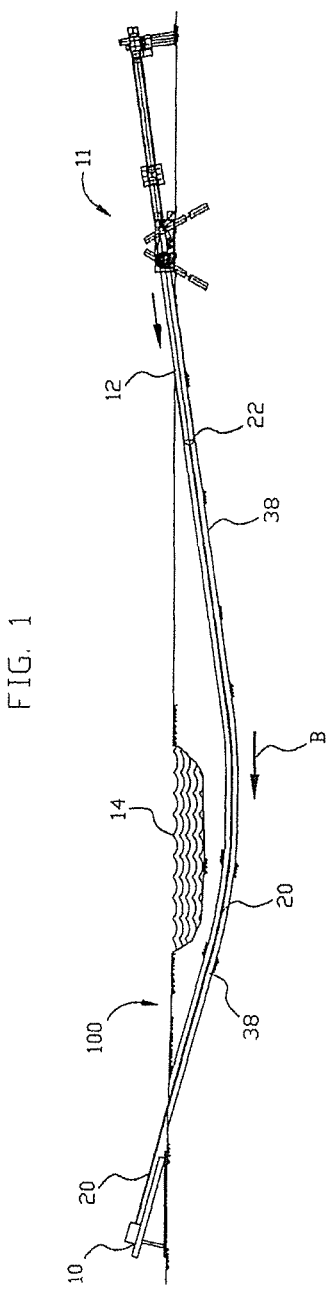

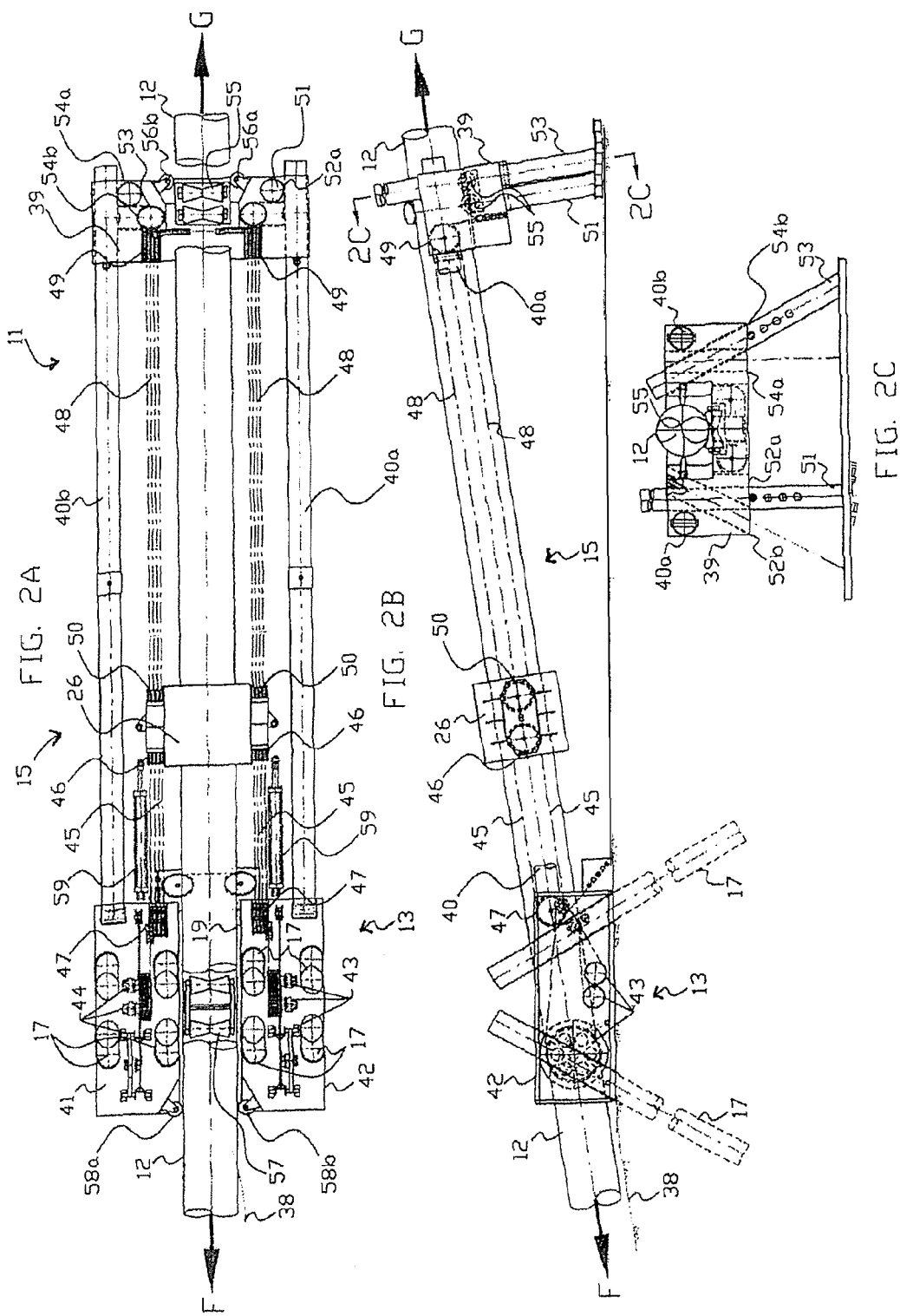

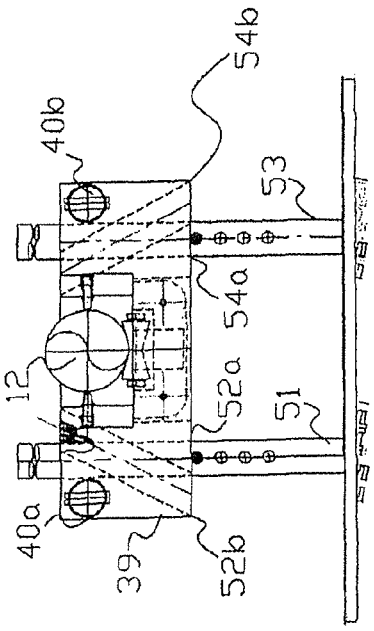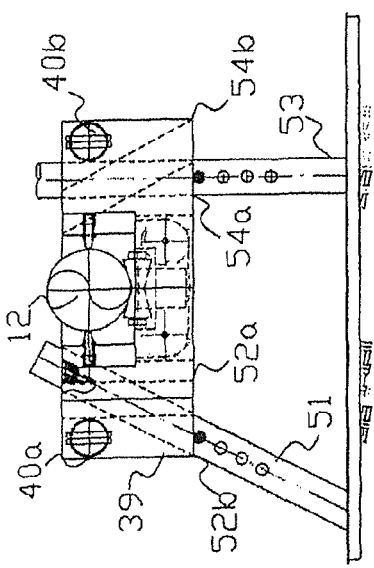

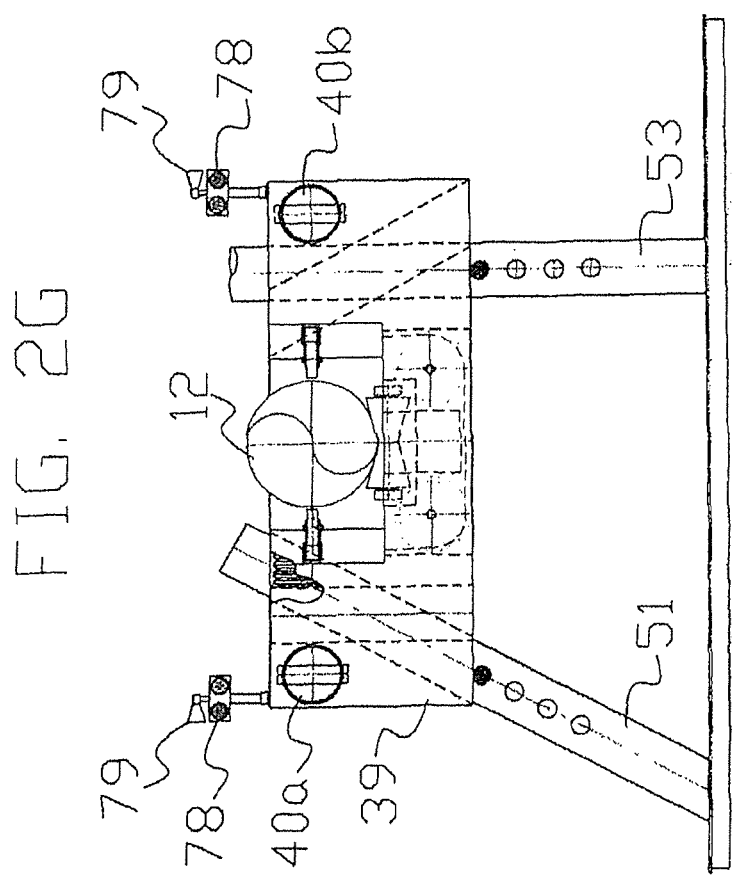

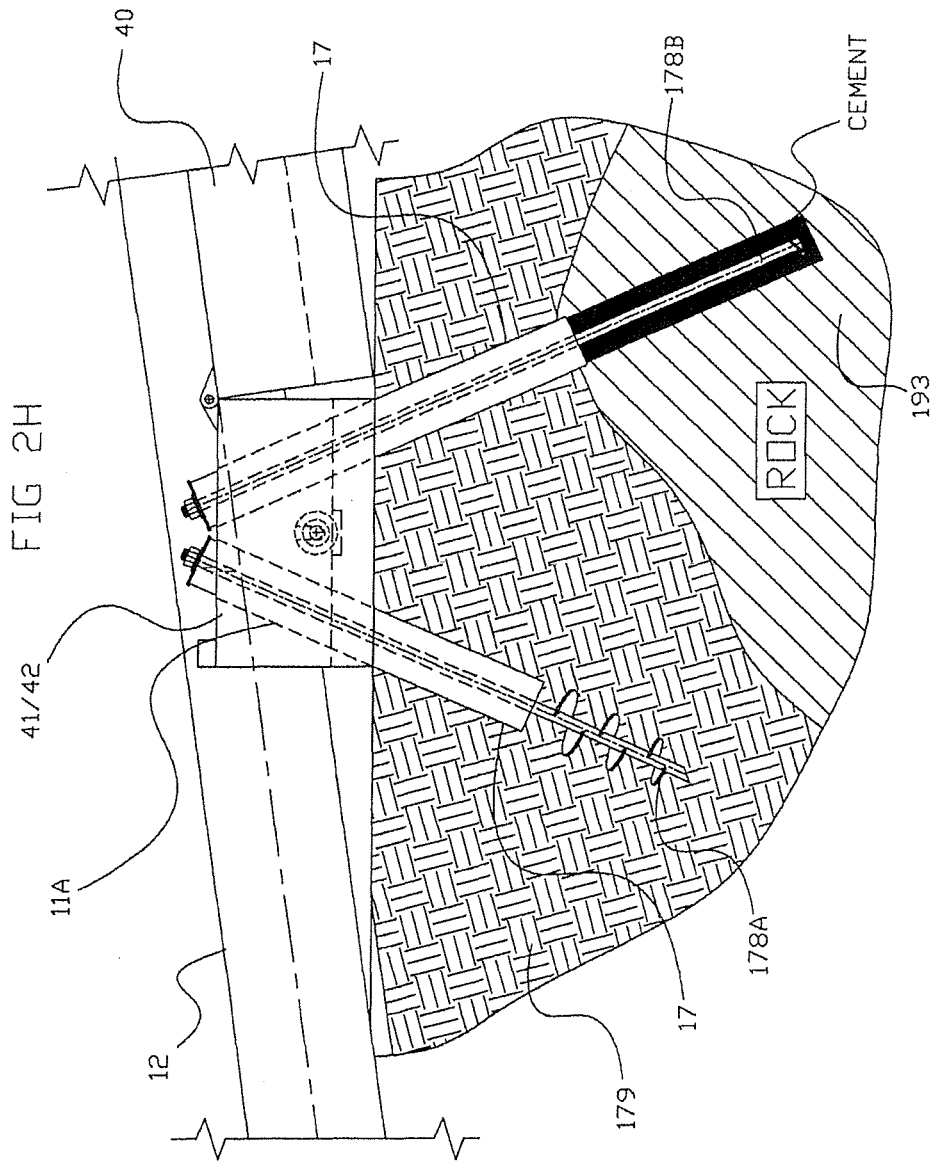

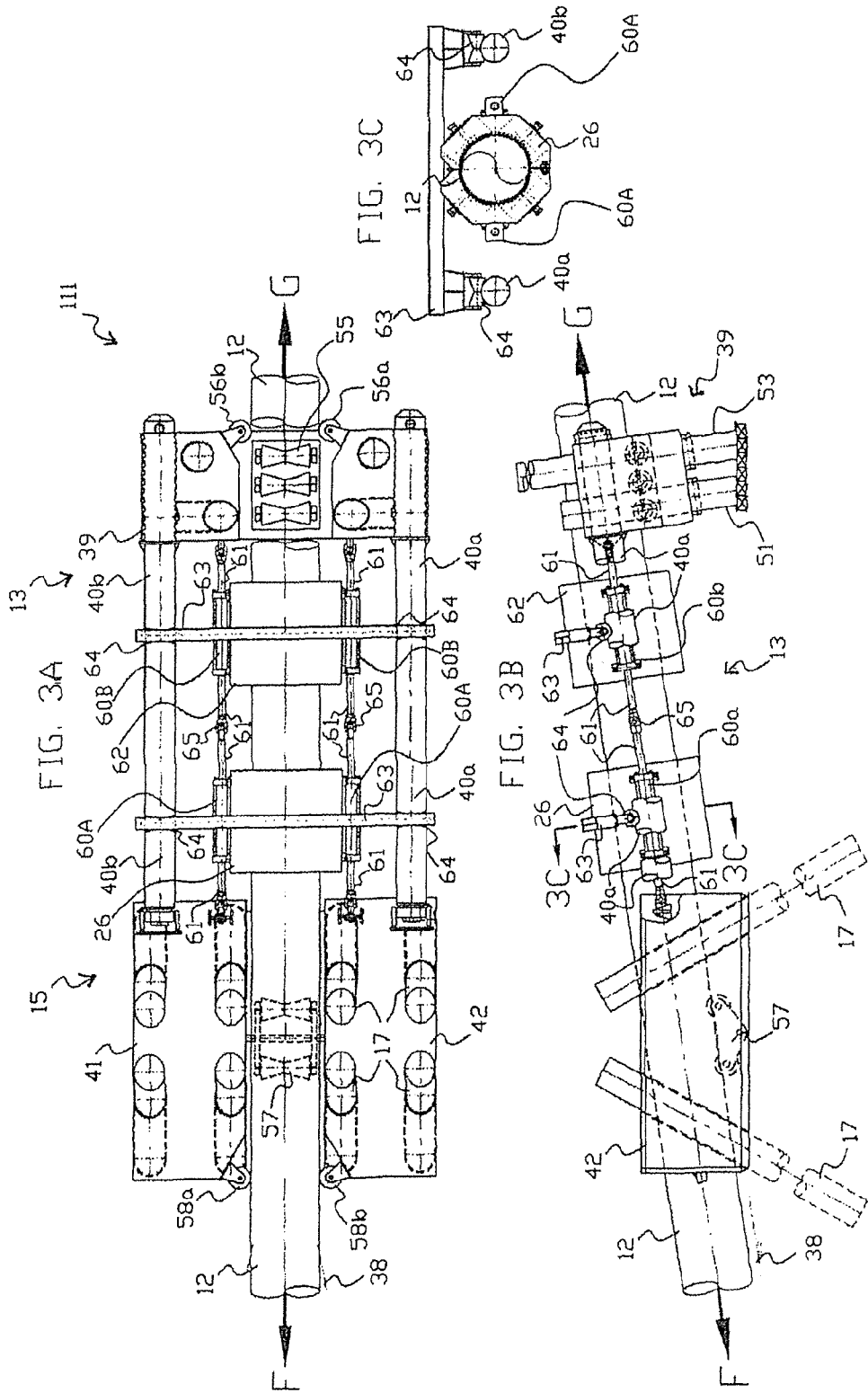

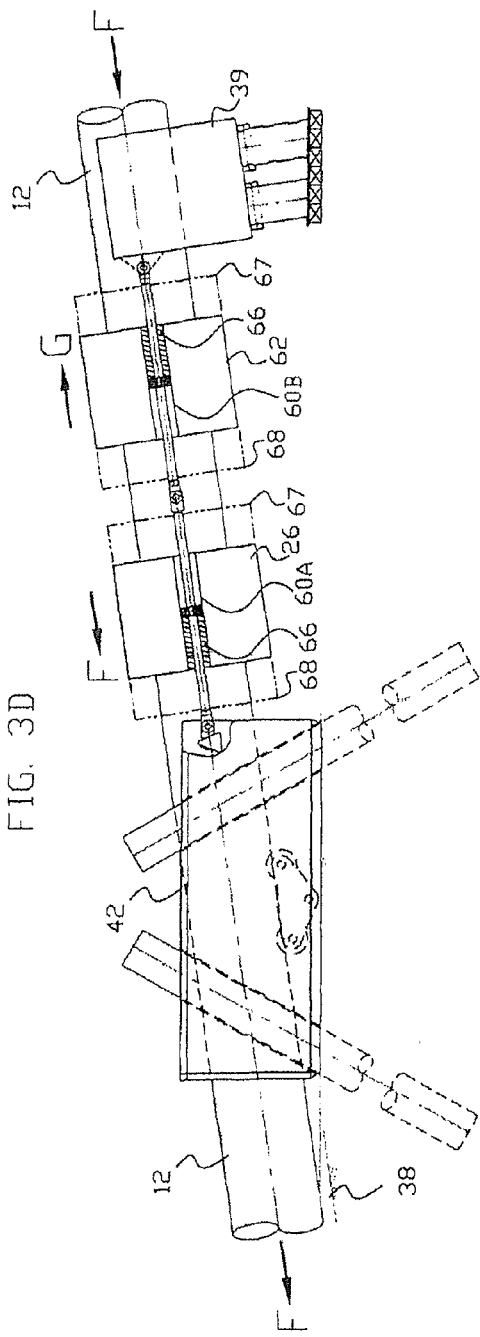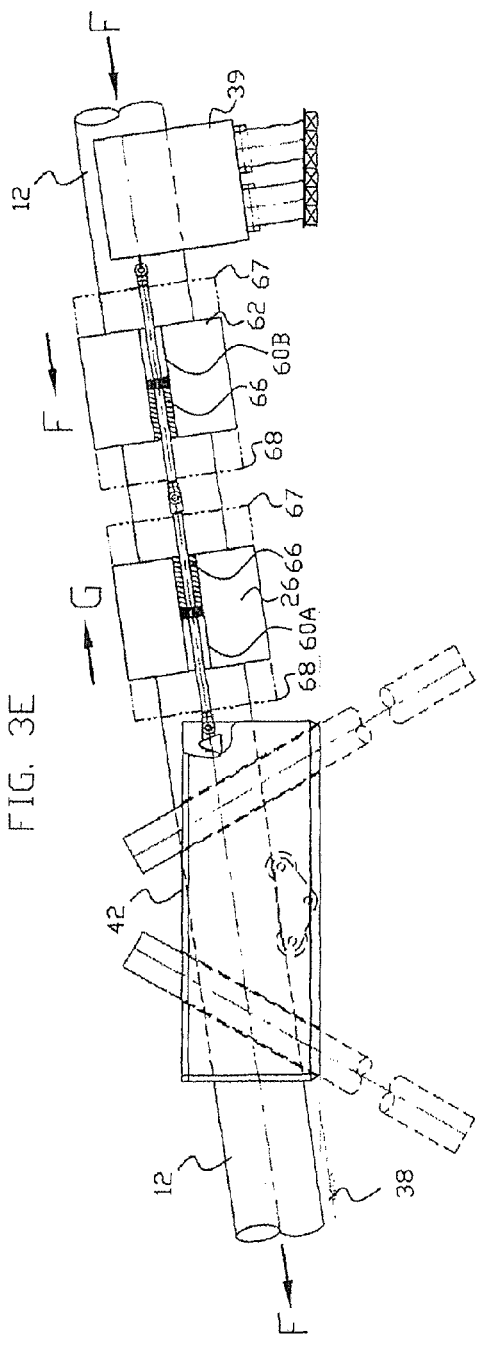

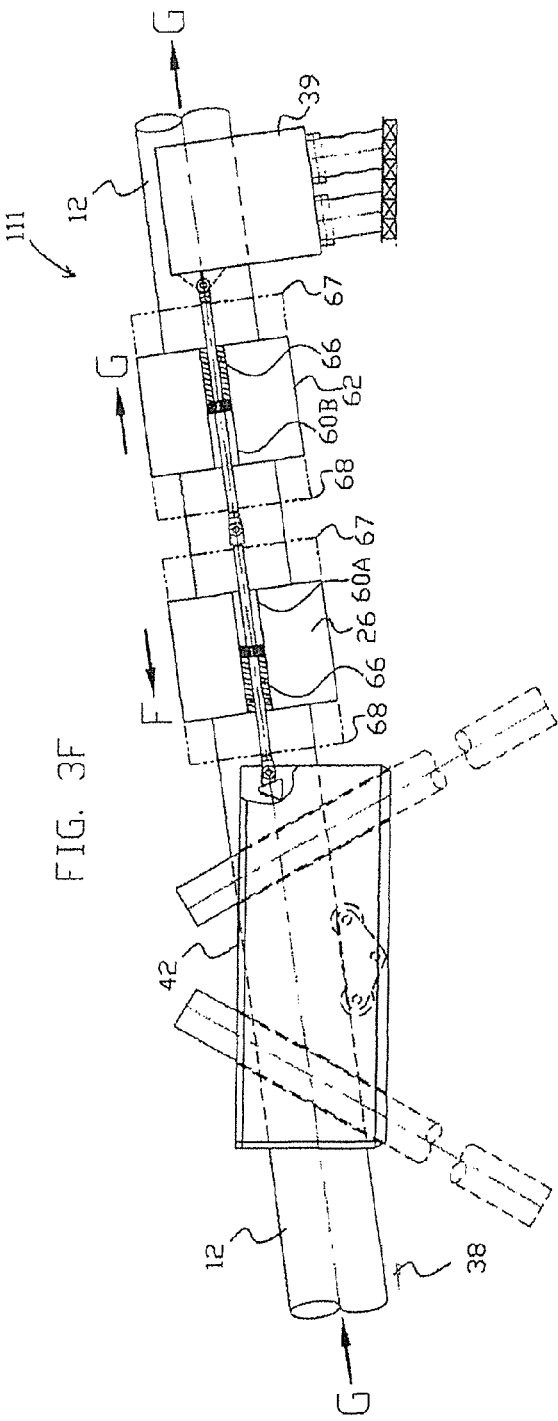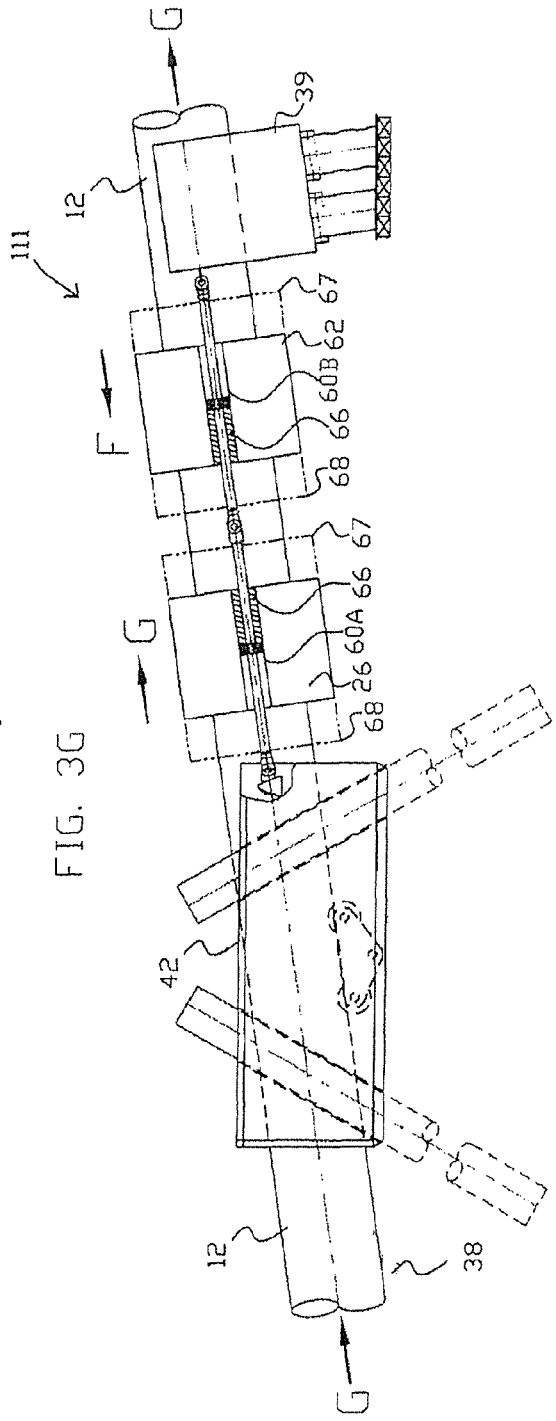

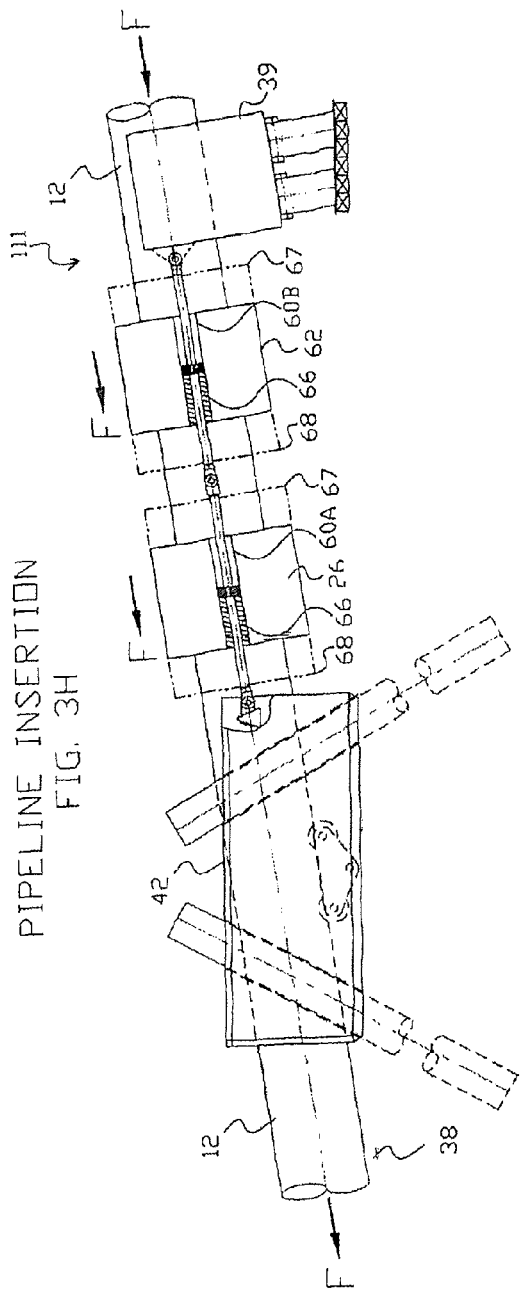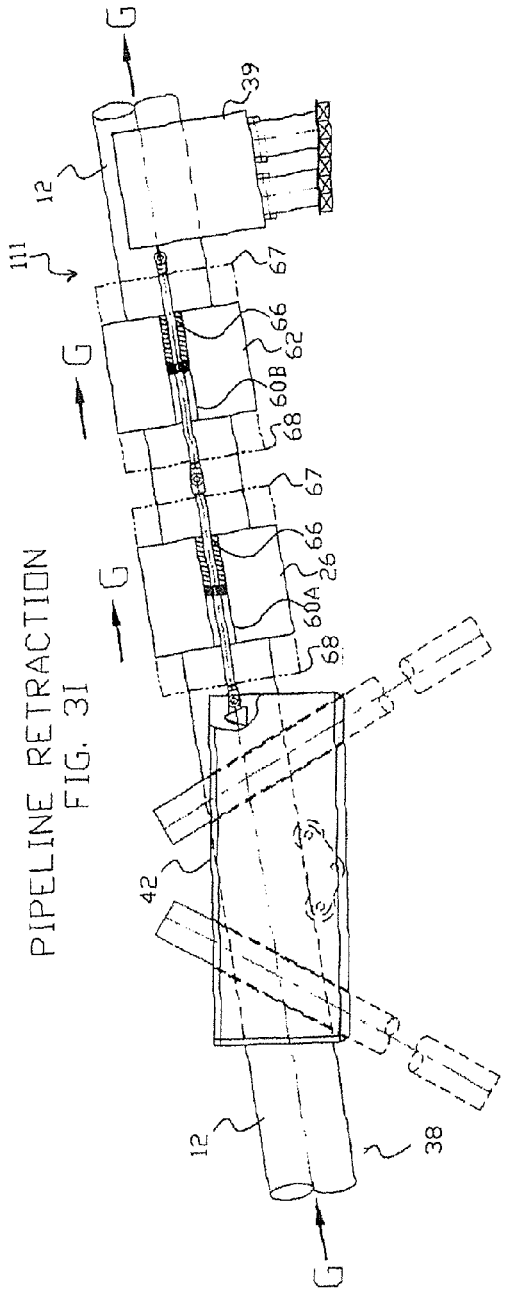

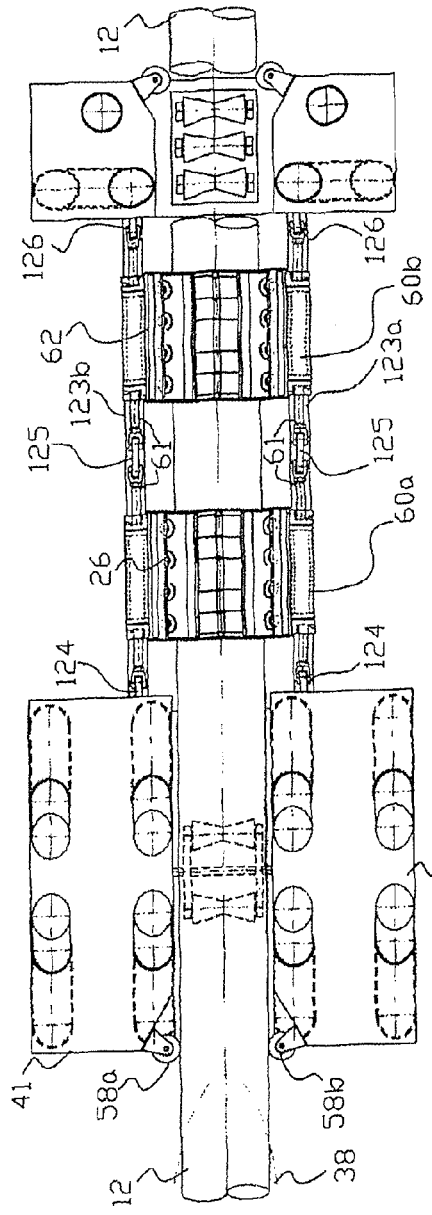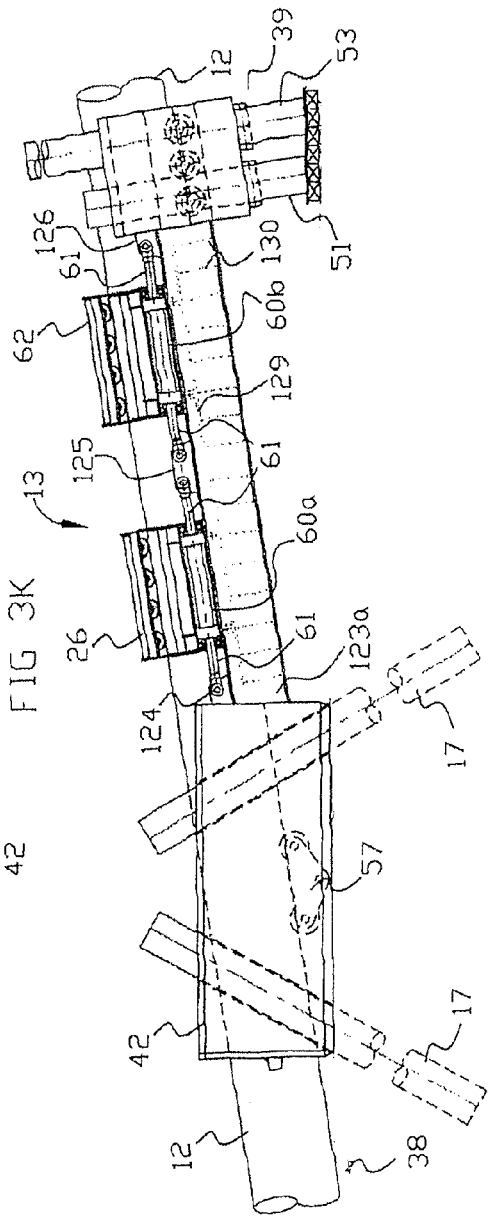

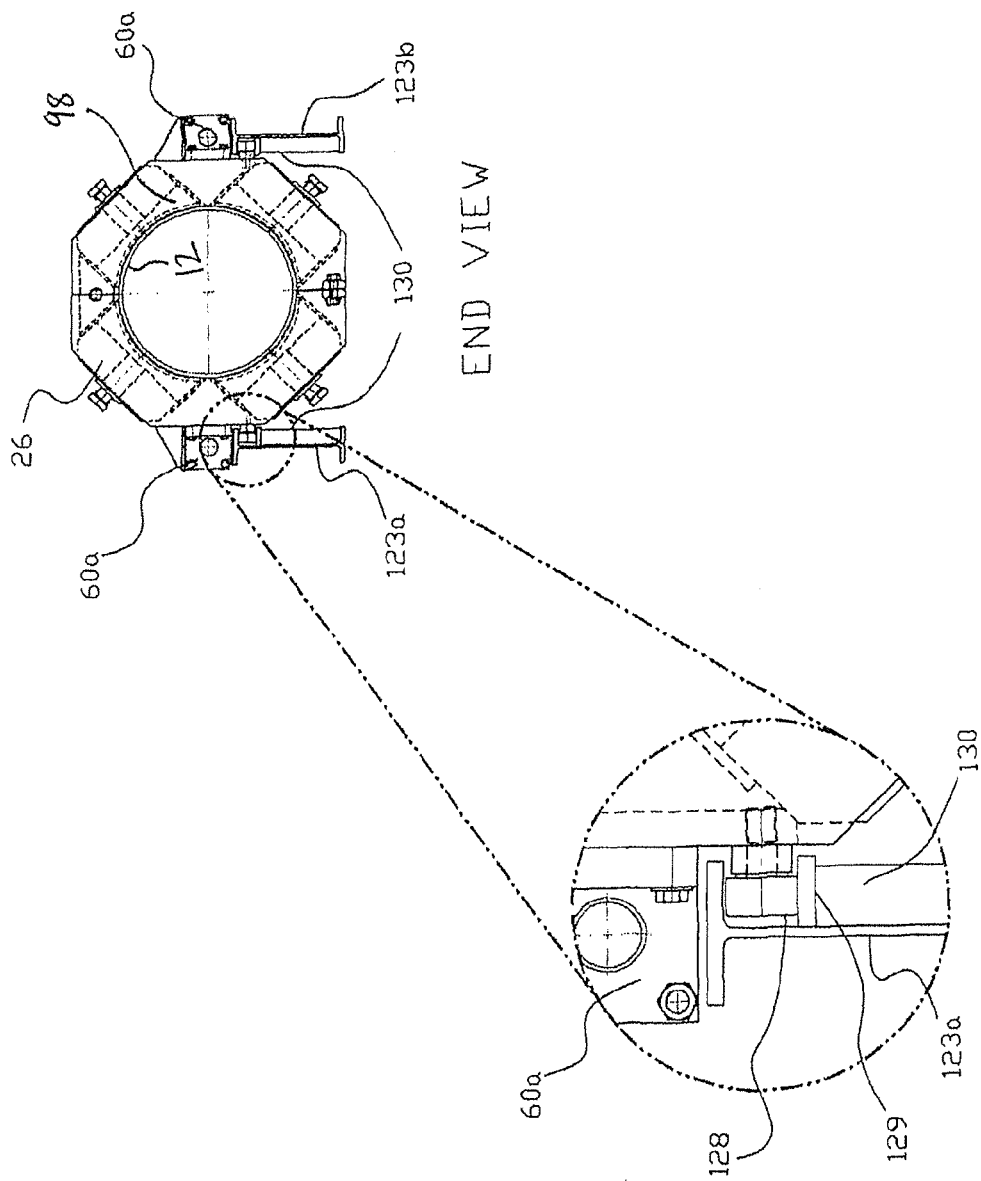

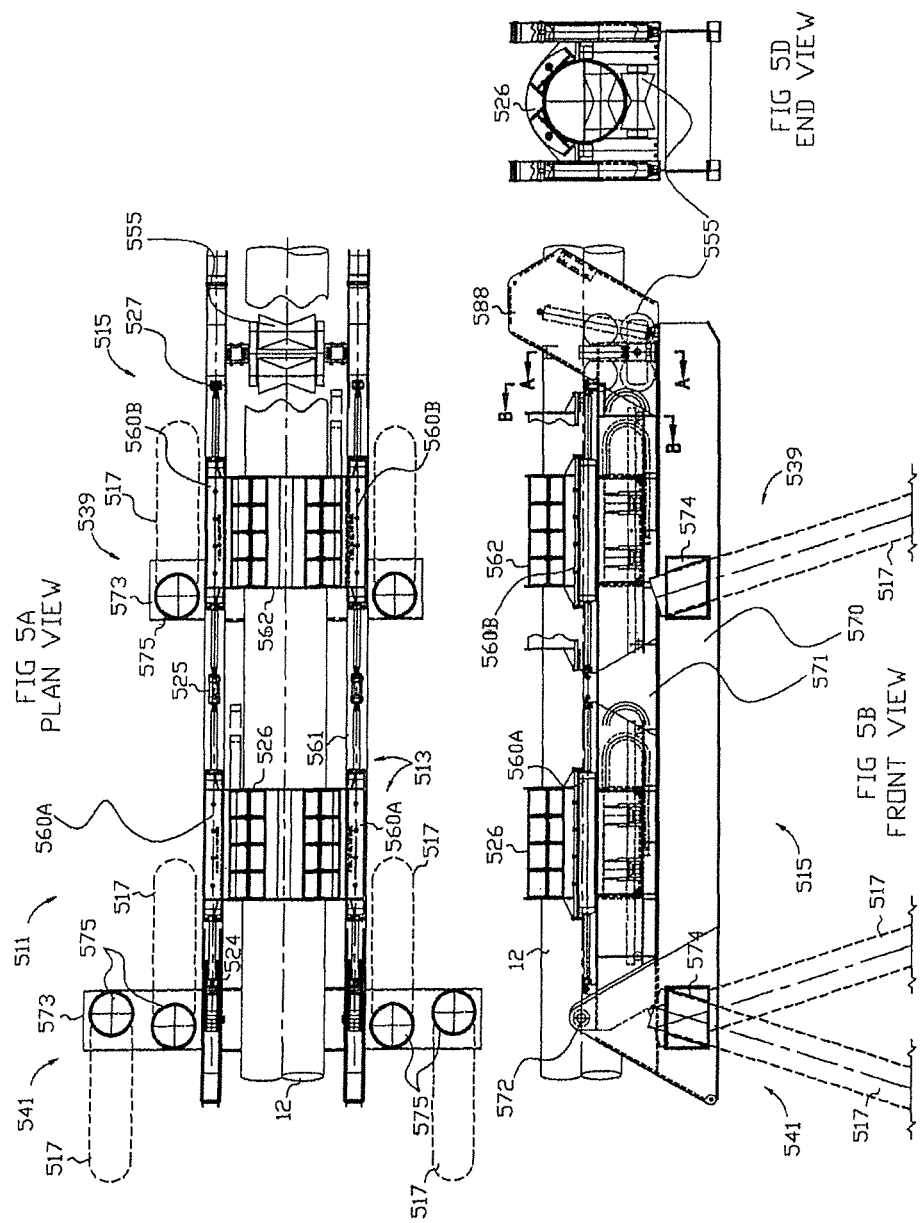

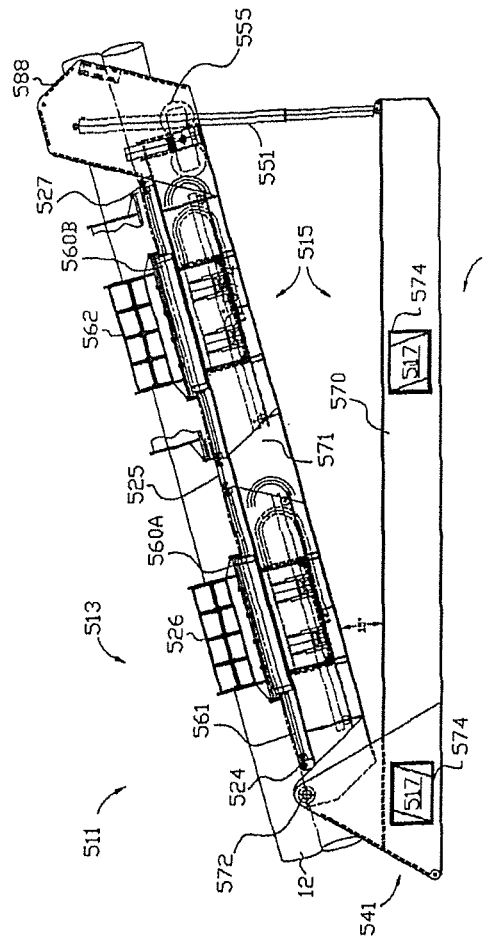
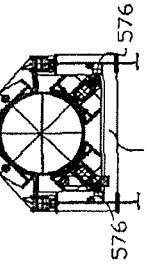
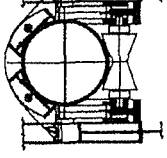

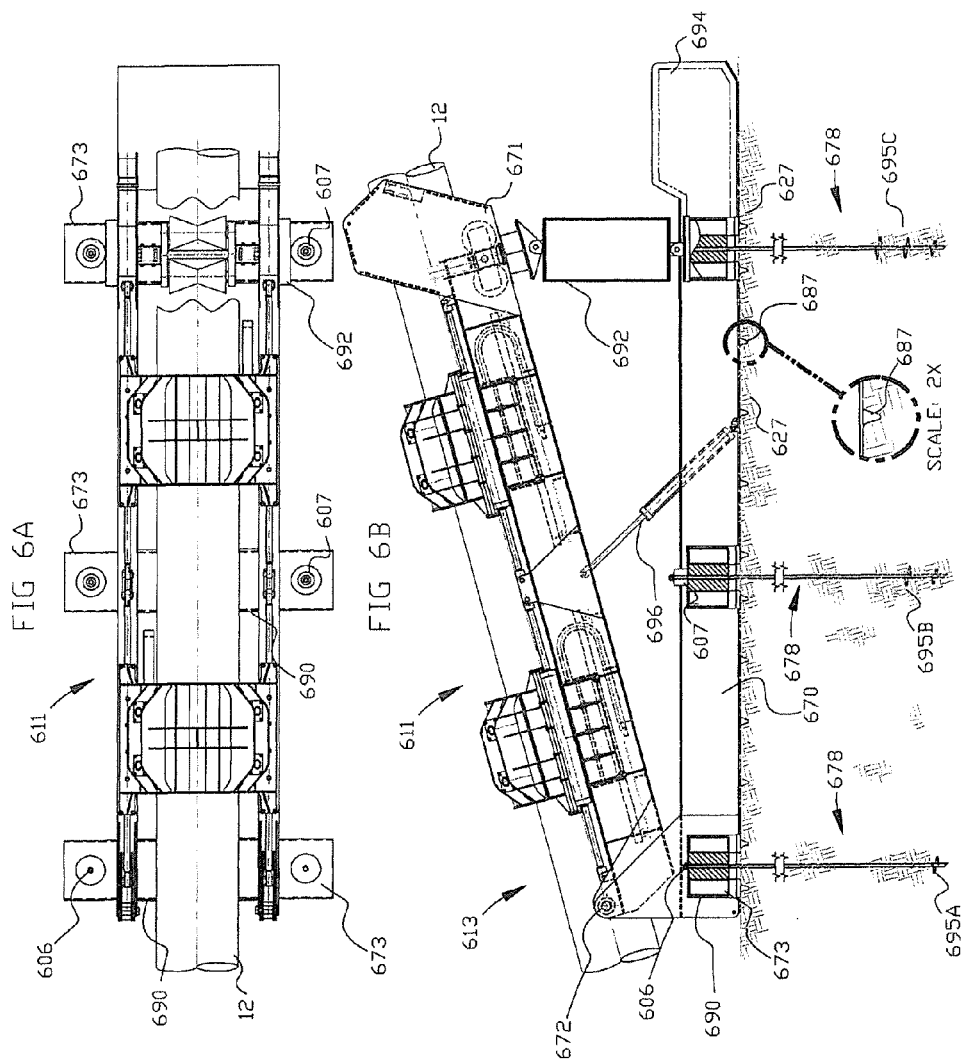

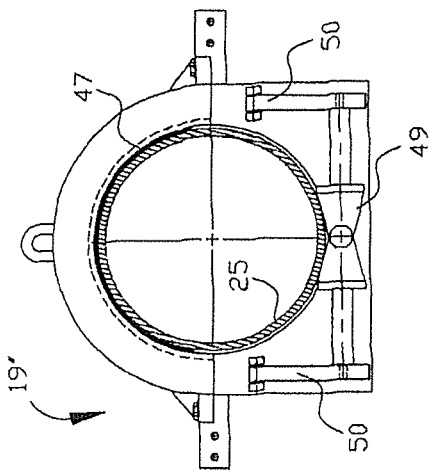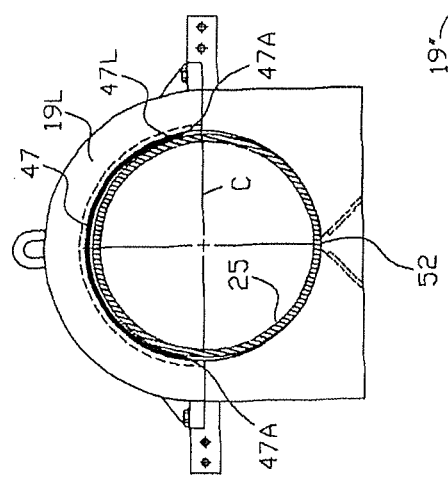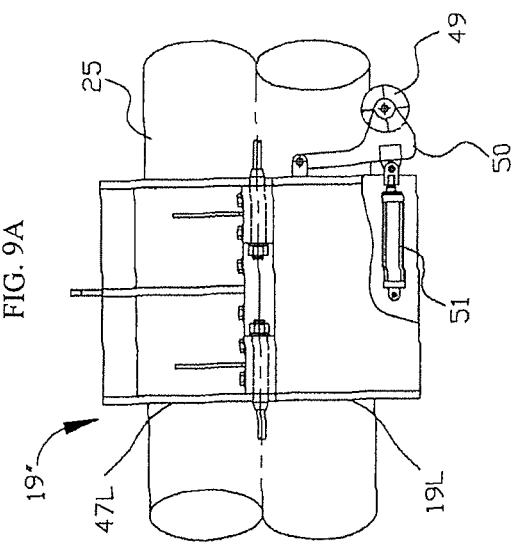

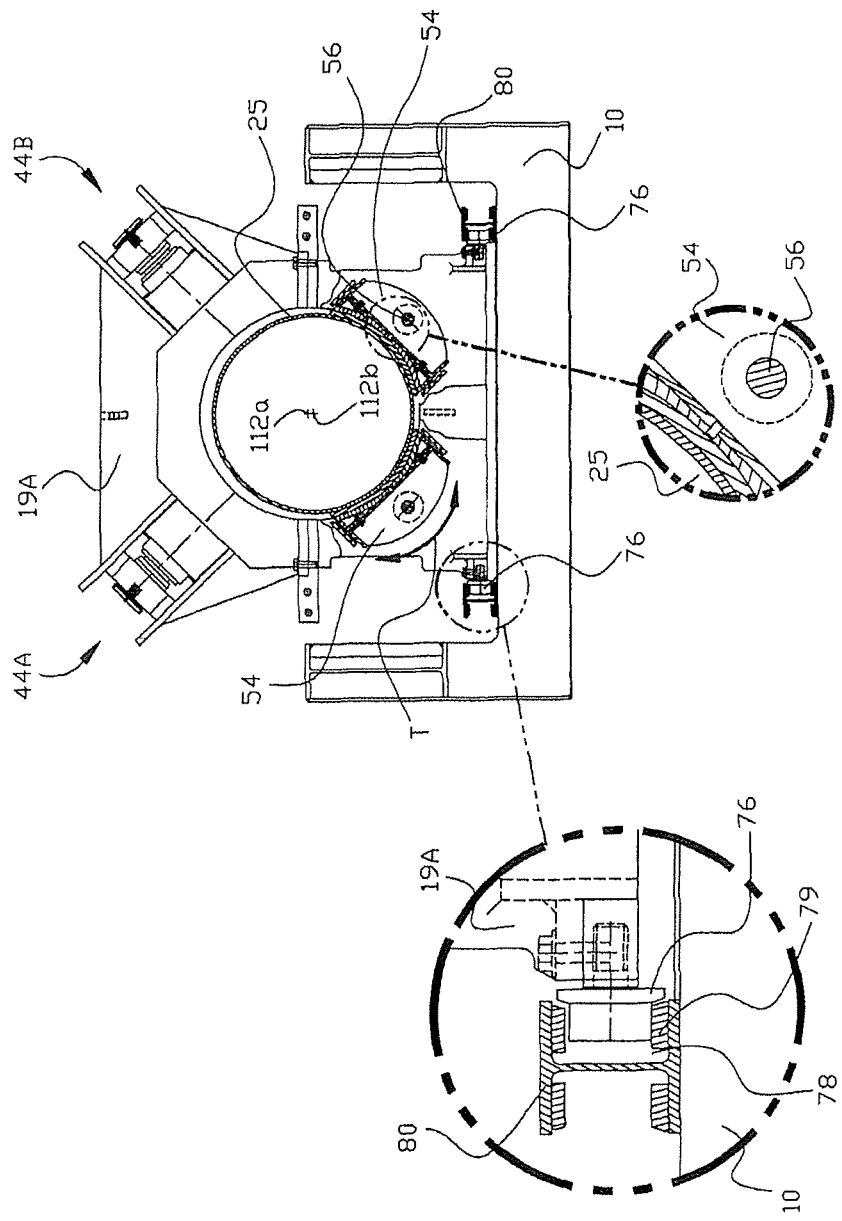

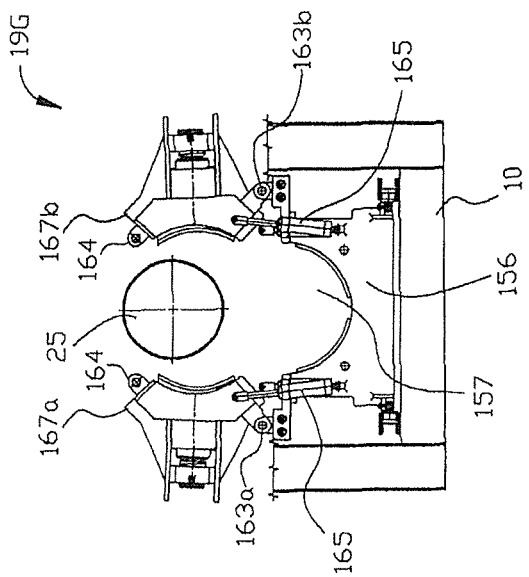
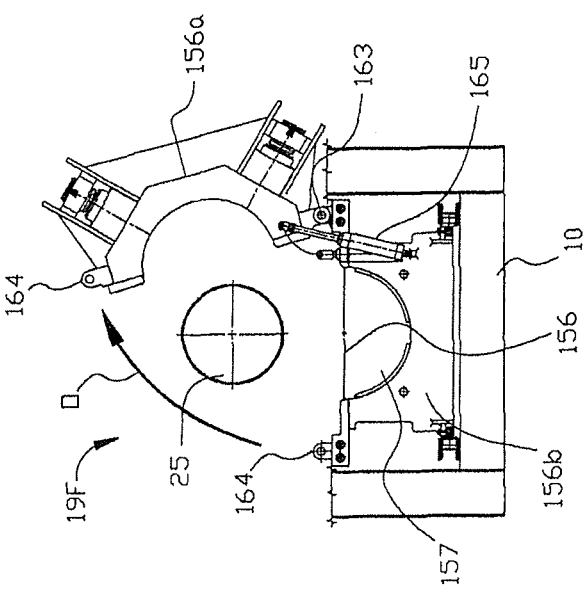

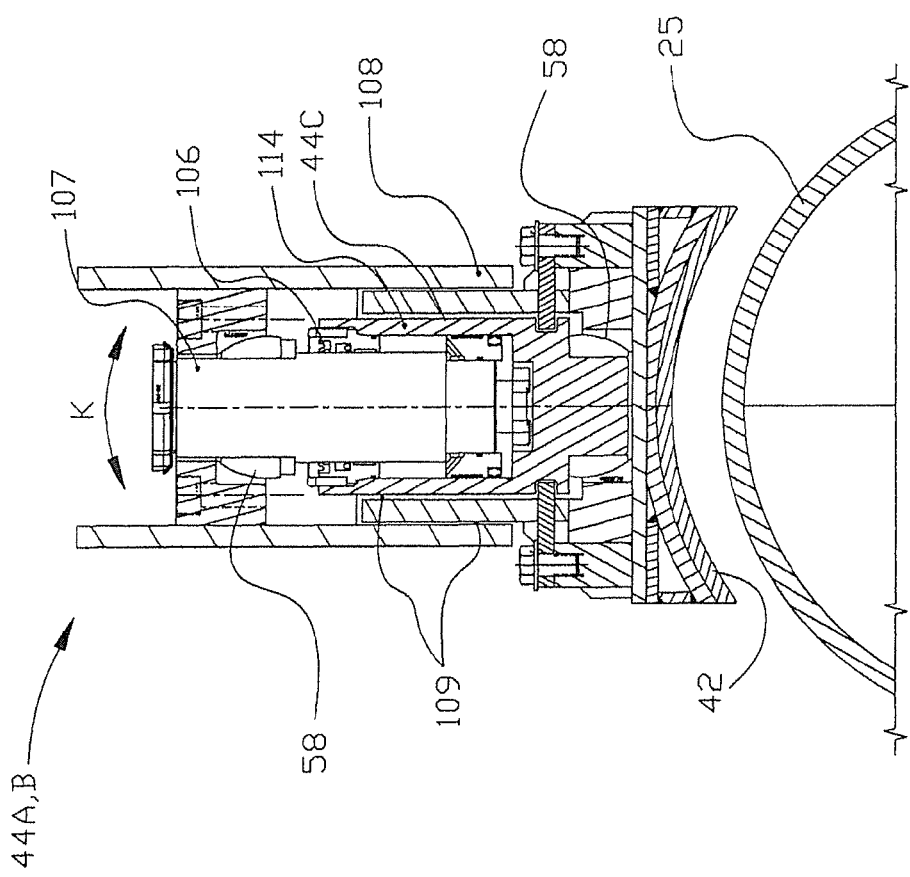

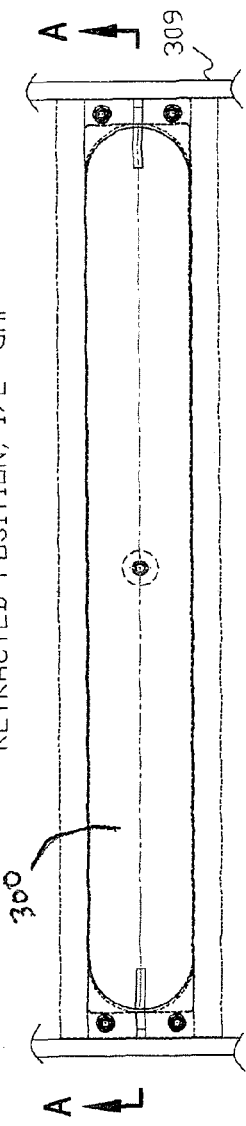
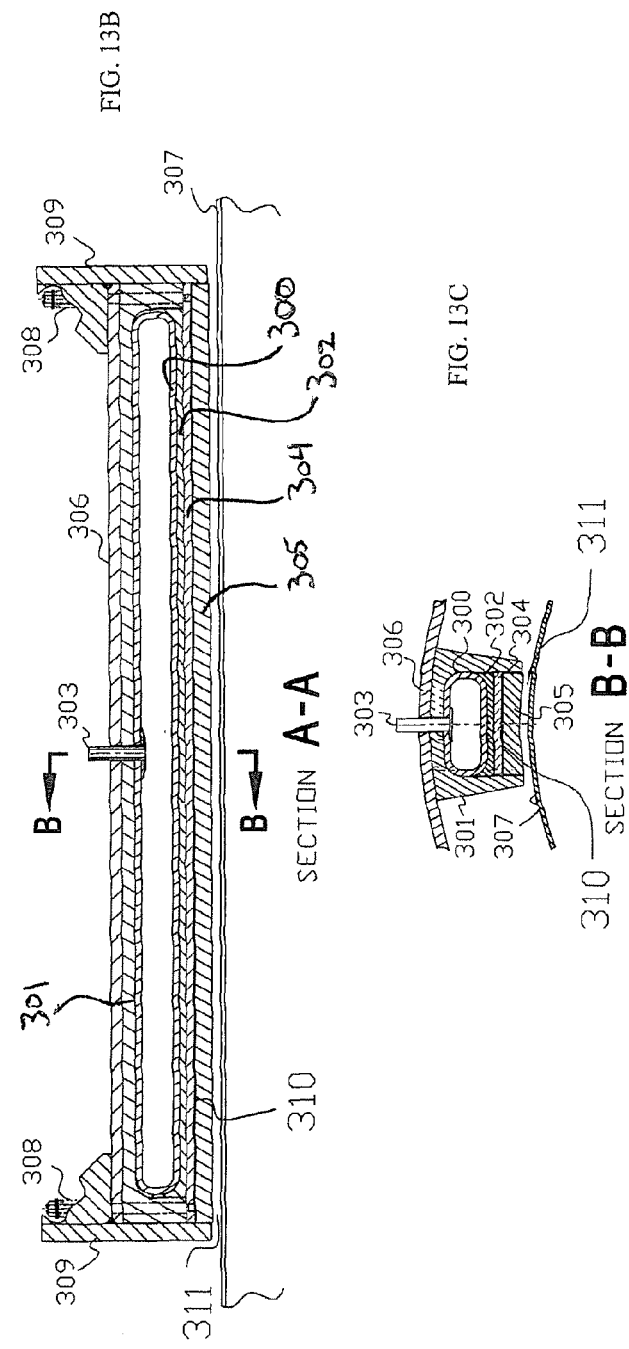
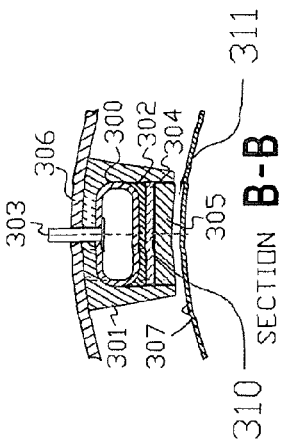

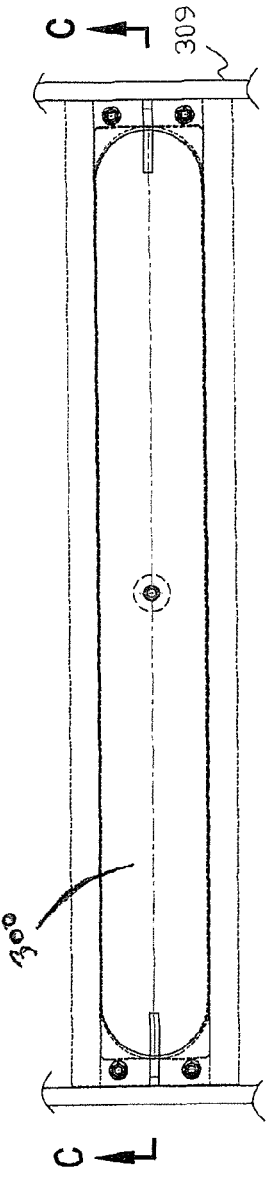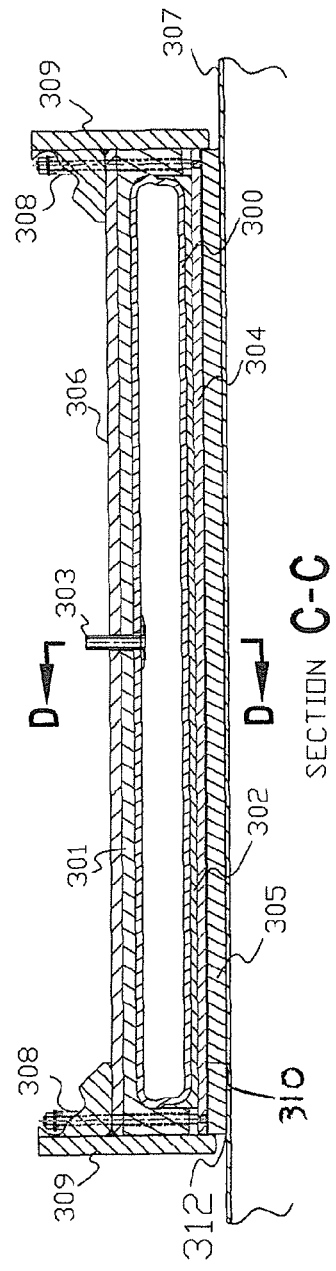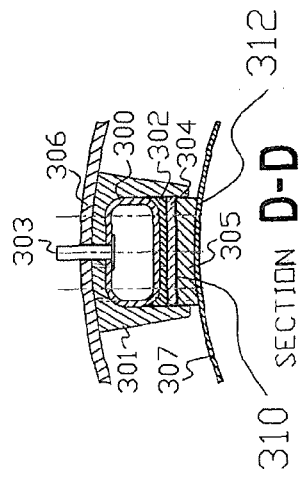

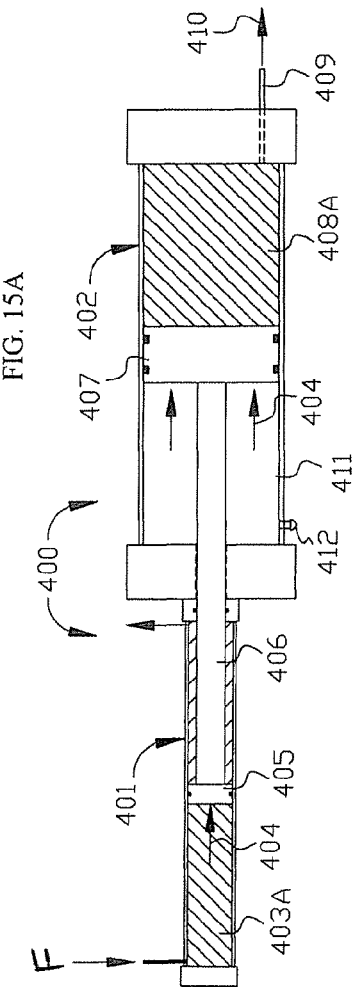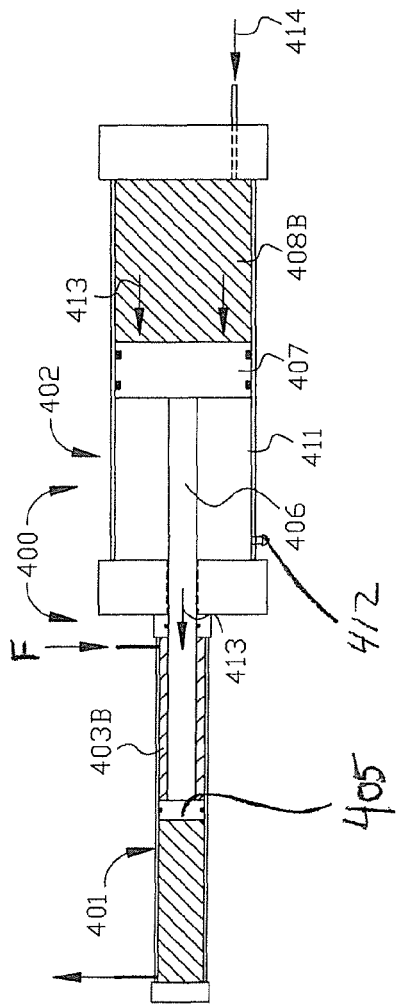
FIG. 15A
FIG. 15B

METHOD AND APPARATUS FOR FORCING A PIPELINE INTO OR OUT OF A BOREHOLE

CROSS-REFERENCE

This application claims priority to and the benefit of U.S. Provisional Application No. 61/513,430, filed Jul. 29, 2011, and U.S. Provisional Application No. 61/619,314, filed Apr. 2, 2012, the entire contents of which are incorporated herein by reference.

FIELD OF THE INVENTION

This invention relates to horizontal directional drilling under the broad field of trenchless technology. More particularly, it relates to an apparatus and an associated method to thrust a pipeline into a borehole or to withdraw a pipeline from a borehole.

BACKGROUND

Trenchless installation techniques are known for underground placement of utility and transmission lines, such as for oil and gas products, electrical power, and telecommunications. One method of trenchless installation is referred to as "horizontal directional drilling", a method preferred for placing pipelines under obstacles such as rivers or lakes. Variations of this method are disclosed and taught by my prior patents, entitled "Drilling Method and Apparatus for Large Diameter Pipe", U.S. Pat. No. 4,221,503; and "Method and Apparatus for Thrusting a Pipeline into Bore Hole", U.S. Pat. No. 5,375,945.

A known method of horizontal directional drilling includes drilling a borehole with a drilling rig and drilling pipe string, and then pulling a pipeline back through the borehole. The borehole extends in the desired path for the pipeline, such as under a river or lake. After the borehole has been drilled by the drill string, the front end of the pipeline is attached to the drill string so that the pipeline is pulled into the borehole as the drill string is removed. The drilling rig located at the first end of the borehole (the borehole entry) may be used to withdraw the drill string from the borehole, and in addition, a pipe thruster located at the second end of the borehole (the borehole exit) may be used to push the pipeline into the borehole. If the pipeline is small and short enough, the drilling rig alone may be used to withdraw the drill string and pull the pipeline into the borehole, or the pipe thruster alone may be used to push the pipeline into the borehole. For larger or longer pipes, the drilling rig and the pipe thruster work together to install the pipeline into the borehole.

Various known pipe thrusters and associated methods for placing pipelines into boreholes have encountered shortcomings that limit their effectiveness and performance. As an example, there have been difficulties in arranging a pipe thruster that can easily and quickly reverse direction, to withdraw a pipeline from a borehole if necessary. This may be useful, for example, if the pipeline gets stuck in the borehole or becomes damaged during installation, or if the borehole needs reconditioning. Existing pipe thrusters may need to be partially disassembled and reconfigured to move in reverse, and/or may operate more slowly in reverse. This has proven to be time consuming and costly, and the inability to quickly withdraw the pipeline from the borehole raises the risk of the pipeline becoming stuck.

Another example is the difficulty of coordinating the movement of the pipe thruster on one end and the drilling rig on the other end. Some pipe thrusters operate through a shorter travel range than the drilling rig, and as a result the drilling rig must pause mid-stroke to wait for the pipe thruster to reset. When hydraulic cylinders are used to thrust the pipeline, short hydraulic cylinders may have to be repeatedly extended and retracted, slowing down the overall operation, while longer hydraulic cylinders may be subject to damage from excessive compression and/or torsional damage from pipeline roll.

During installation, stabilization of the pipeline against torsion and roll has also proved challenging. In addition, existing pipe thrusters have limited features and are difficult to operate. Accordingly a need exists for an improved pipe thruster that is easier to operate, with a more robust design.

SUMMARY

In accordance with the present invention, a method and apparatus are provided for thrusting a pipeline into a borehole, to address many of the problems encountered by prior systems. In one embodiment, a pipe thrusting apparatus for inserting and removing a pipe from a borehole includes a collar configured to releasably grip the pipe, and a support frame. The support frame includes a rear support for supporting the pipe, a front anchor securable to the ground between the rear support and the borehole, and a compression member joining the front anchor to the rear support. The pipe thrusting apparatus also includes a bi-directional driver coupled between the collar and the support frame. The driver is configured to drive the collar toward and away from the borehole, to insert and remove the pipe from the borehole.

In one embodiment, a horizontal directional drilling system includes a drilling rig coupled to a drill string for drilling a borehole. The drilling rig is positioned at an entry of the borehole. The drilling system also includes a pipeline coupled to the drill string for insertion into the borehole, and a pipe thrusting apparatus as described in the preceding paragraph. The pipe thrusting apparatus is positioned at an exit of the borehole and engages the pipeline to insert the pipeline into the borehole.

In one embodiment, a method of inserting a pipeline into a borehole includes drilling by a drilling rig a borehole from an entry to an exit. The drilling rig is located at the entry of the borehole and has a drill stroke. The method also includes locating a pipe thrusting apparatus at the exit of the borehole. The pipe thrusting apparatus includes a collar, a driver, and a support frame. The method also includes energizing the collar to grip the pipeline, engaging the driver between the support frame and the collar to continuously drive the collar forward toward the borehole through a length at least as long as the drill rig stroke, and engaging the driver in reverse between the support frame and the collar to drive the collar in reverse away from the borehole. A force applied by the driver is the same in forward and reverse.

According to an embodiment of the present invention, the support frame enables impetus to be applied to a collar or collars in axial, alignment with the borehole in either direction of travel (forward or reverse), without the need to reposition the collar or reconfigure the routing of the cable through a plurality of sheaves between the frame and collar. The support frame reacts against the force applied by the driver, and also supports and aligns the pipeline. In one embodiment, the driver is a cable and winch system that is incorporated into the reactionary support frame itself. In one embodiment, the driver includes a pair of double-acting cylinders between the frame and two collars to provide equal speed and axial force in either direction of travel. The collars and cylinders can be synchronized to apply force in unison to achieve increased axial force to the pipeline, or can be operated independently of each other, achieving continuous (or near continuous) motion to the pipeline.

BRIEF DESCRIPTION OF THE DRAWINGS

FIG. 1 is an elevational view of a horizontal drilling system including a pipe thruster, borehole, and drilling rig.

FIG. 2A is a top view of a pipe thruster with a two-winch system, according to an embodiment of the invention.

FIG. 2B is a side elevational and partial cross-sectional view of the pipe thruster of FIG. 2A.

FIG. 2C is an end view of the support frame of the pipe thruster of FIG. 2A, viewed along the line 2C in FIG. 2B.

FIGS. 2D-F illustrate various support leg positions for the pipe thruster of FIG. 2A.

FIG. 2G illustrates audio and visual signaling equipment for a pipe thruster according to an embodiment of the invention.

FIG. 2H is an enlarged view of a pile well for a pipe thruster, according to an embodiment of the invention.

FIG. 3A is a top view of a pipe thruster with a hydraulic cylinder system, according to an embodiment of the invention.

FIG. 3B is a side elevational and partial cross-sectional view of the pipe thruster of FIG. 3A.

FIG. 3C is a simplified cross-sectional view of the collar of the pipe thruster of FIG. 3A, taken along line 3C in FIG. 3B.

FIGS. 3D-I are elevational views illustrating the sequencing and manipulation of the pipe thruster of FIG. 3A.

FIG. 3J is a top view of a pipe thruster with a hydraulic cylinder system, according to an embodiment of the invention.

FIG. 3K is a side elevational view of the pipe thruster of FIG. 3J.

FIG. 3L is a front and enlarged view of the collar, compression members, and hydraulic cylinders of the pipe thruster of FIG. 3J.

FIG. 5A shows a top view of a pipe thruster according to an embodiment of the invention.

FIG. 5B shows a side view of the pipe thruster of FIG. 5A.

FIG. 5C shows a side view of the pipe thruster of FIG. 5A, in an elevated position.

FIG. 5D shows a rear view of the pipe thruster of FIG. 5A.

FIG. 5E shows a cross-sectional view of the pipe thruster of FIG. 5B, taken along like A-A.

FIG. 5F shows a cross-sectional view of the pipe thruster of FIG. 5B, taken along like B-B.

FIG. 6A is a top view of a pipe thruster according to an embodiment of the invention.

FIG. 6B is a side view of the pipe thruster of FIG. 6A.

FIG. 7 is a front view of a collar with the pipeline in a lowered position (with the pipeline shown in cross-section).

FIG. 8 is a cross-sectional view of a collar having a roller mechanism according to an embodiment of the invention.

FIG. 9A is a side view of the collar of FIG. 8.

FIG. 11 is an enlarged view of a bearing utilized in a collar for a pipe thruster, according to an embodiment of the invention.

FIG. 13A is a top view of an individual bladder in a retracted position.

FIG. 13B is a cross-sectional view of the bladder of FIG. 13A.

FIG. 13C is a cross-sectional view of the bladder of FIG. 13B.

FIG. 14A is a top view of an individual bladder in a gripping position.

FIG. 14B is a cross-sectional view of the bladder of FIG. 14A.

FIG. 14C is a cross-sectional view of the bladder of FIG. 14B.

FIGS. 15A and 15B are cross-sectional views of a fluid metering system for inflating the bladders.

DETAILED DESCRIPTION

Figure 4:
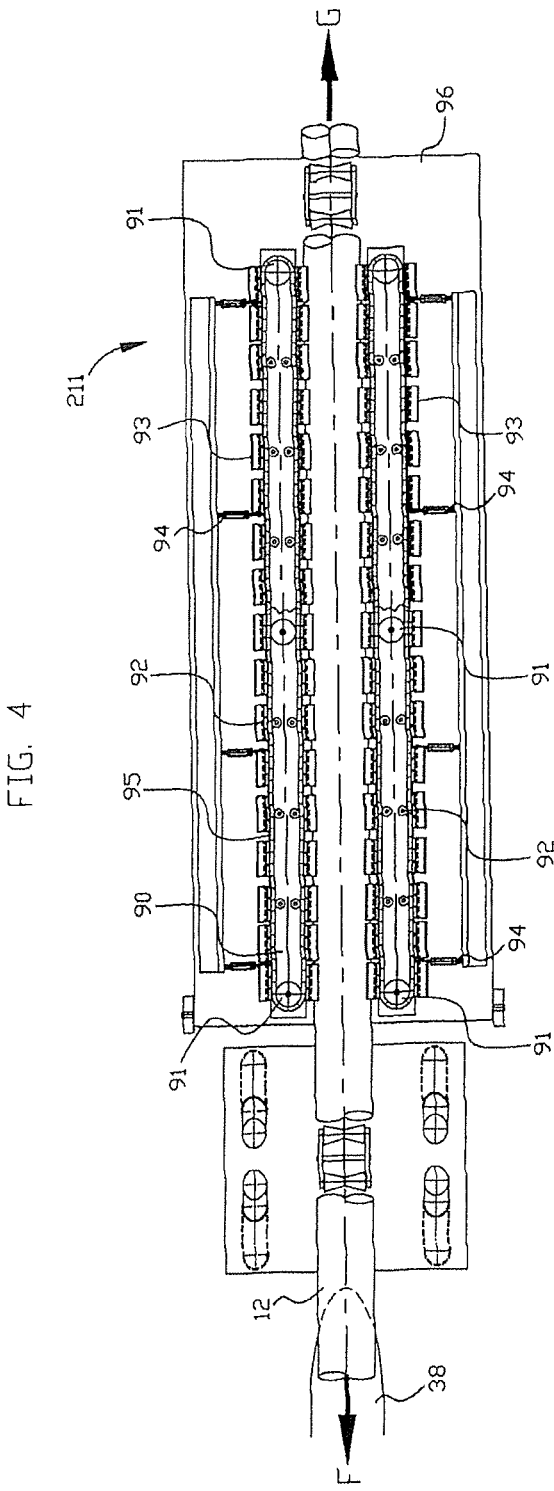
FIG. 4 is a top view of a pipe thruster according to an embodiment of the invention.

The present invention relates to horizontal directional drilling, and more particularly, to an apparatus and an associated method to thrust a pipeline into a borehole or to withdraw a pipeline from a borehole. In one embodiment, a pipe thrusting apparatus includes a collar that grips and releases the pipe. A bi-directional driver, such as a pulley and cable system or a pair of hydraulic cylinders, drives the collar toward or away from the borehole, to either insert the pipeline into the borehole or withdraw it from the borehole. The driver can drive the pipeline in either direction—forward into the borehole or in reverse, out of the borehole—without being disassembled and reconfigured. That is, the driver can operate in both directions. The pipe thrusting apparatus also includes a support frame, which is anchored into the ground to react against the force applied by the driver. In one embodiment, the support frame includes a rear support base, which supports the trailing end of the pipeline, a front anchor between the rear base and the borehole, and one or more compression members that join the front anchor to the rear support base. The compression member may alternately be referred to as support structure connecting the rear support and the front anchor. These components jointly form the support frame against which the driver acts to move the pipe. In another embodiment, the support frame includes an anchor platform and a liftable thrust frame against which the driver acts to move the pipe.

FIG. 1 shows a horizontal drilling system 100 according to an embodiment of the invention. The drilling system 100 includes a drilling rig 10 and a pipe thruster 11 that are coordinated together to insert a pipeline 12 into a borehole 38. First, the drilling rig 10 drills the borehole 38 with the drill string 20. The borehole 38 is drilled in the desired path, such as below a lake or river 14. Once the borehole has been formed, the drilling rig 10 is operated in reverse to withdraw the drill string 20 from the borehole. The pipeline 12 is attached to the leading end of the drill string 20 via a pulling head 22. In one embodiment, the pulling head 22 is a swivel that enables the drill string 20 to rotate freely without twisting the pipeline 12. The drilling rig 10 and the pipe thruster 11 work in unison, at the entry and exit points of the borehole, to remove the drill string 20 and insert the pipeline 12, in the direction of arrow B. The system can also work in reverse, to remove the pipeline from the borehole if necessary. Drilling fluid may be pumped into the borehole to keep it lubricated and to prevent the pipeline from sticking. The pipeline is not purposely rotated while it is moved into or out of the borehole, as twisting of the pipeline may be undesirable to the thrusting apparatus. Thus the drilling fluid reduces the friction along the borehole as the pipeline is moved.

A pipe thruster 11 according to an embodiment of the invention is shown in more detail in FIGS. 2A-G. The pipe thruster 11 includes a collar 26 for gripping the pipe 12, a bi-directional driver 13 for moving the collar toward and away from the borehole, and a support frame 15 against which the driver 13 acts to move the collar and the pipe. The pipe thruster 11 is suitable for moving pipelines of 30 inches in diameter, or even larger, such as up to 60 inches in diameter, in one embodiment.

The support frame 15 includes a front anchor 41/42, a rear support or base 39, and two compression members 40*a*, 40*b* connecting the front anchor to the rear support. The front anchor includes first and second portions 41, 42 on each side of the pipeline 12. The front anchor 41/42 is securely fixed to the ground in front of the borehole 38. The rear support is also fixed to the ground either by legs or pilings, behind the front anchor. The compression members connect the front anchor to the rear support, to form the connected reactionary support frame 15. The driver 13 acts against this frame to move the pipe into or out of the borehole.

In the embodiment of FIGS. 2A-C, the bi-directional driver 13 includes first and second pulley systems. The first pulley system is coupled to the front anchor 41/42 and the collar 26 to insert the pipe into the borehole, and the second pulley system is coupled to the rear support 39 and the collar 26 to remove the pipe from the borehole. These two pulley systems enable the driver 13 to operate in forward and reverse, to move the pipe in either direction, without requiring the pipe thruster 11 to be disassembled and reconfigured. The pulley systems are available to move the pipe in either direction on command. Additionally, the pulley systems are incorporated into and react against the same frame 15 that guides the pipe into the borehole, rather than being attached to a separate structure apart from the pipe guiding frame.

The first pulley system includes a winch 43, a cable 45 and sheaves 46 and 47, to force the pipeline 12 into the borehole 38, as indicated by Directional Arrow F. The winch 43 is mounted to or within the front anchor 42, and thus the winch is incorporated into the frame 15, providing a compact design. The cable 45 is coupled between the collar 26 (at sheaves 46) and the front anchor 41/42 (at sheaves 47). The winch 43 applies tension to the cable 45 to draw the collar 26 toward the front anchor 41/42. The continuous force path for insertion begins at the winch 43 and follows the cable 45 from the winch 43, around the sheaves 46 at the collar, to the sheave 47 at the front anchor 41/42. The force applied by the winch 43 is reacted against the front anchor 41/42. When the collar 26 is engaged to grip the pipe, the operation of the winch 43 drives the pipeline into the borehole, in the direction of arrow F.

The second pulley system enables an immediate retraction of the pipe out of the borehole if necessary, in the direction of arrow G. This second pulley system can retract the pipe from the borehole at a force and velocity equal to the thrusting force of the first pulley system. Thus there is no loss of speed or force in retracting the pipe. The second pulley system includes a winch 44, a cable 48, and sheaves 49 and 50. The winch 44 is secured to the front anchor 41. The cable 48 is coupled from the winch 44, to the rear support 39 (at sheaves 49), and then to the collar 26 (at sheaves 50). The winch 44 applies tension to the cable 48 to draw the collar 26 toward the rear support 39. The continuous force path for retraction begins at the winch 44 and follows the cable 48 from the winch 44 around the sheaves 49 at the rear support, to the sheaves 50 at the collar 26. The force applied by the winch 44 is reacted through the rear support 39 and through the compression members 40*a*, 40*b* to the front anchor structure 41/42. When the collar 26 is engaged to grip the pipe, the operation of the winch 44 drives the pipeline out of the borehole, in the direction of arrow G.

The support frame 15, which includes the front anchor 41/42, the compression members 40*a*, 40*b*, and the rear support 39, is a rigid frame that is securely fixed to the ground, both to support the pipeline 12 as it passes through and to react against the bi-directional driver 13. The front anchor 41/42 is the main reactionary structure, which is firmly secured to the ground to react against the forces applied to the frame 15. As shown in FIG. 2B, pilings 17 are passed through the anchor structures 41, 42 and driven far into the ground below. These pilings 17 pass through corresponding slots in the anchor structures 41, 42 to rigidly mount the anchor to the ground. The driver 13 can then bear against this front anchor 41/42 to drive the collar toward or away from the borehole. To move the pipe into the borehole, the winch 43 acts against the anchor 41/42 to apply tension to the cables 45, to draw the collar 26 toward the borehole. The anchor 41/42 provides a firm reactionary support against this driving force.

In another embodiment, the piling 17 may be replaced with a soil screw, or a combination soil screw and piling. In one embodiment, a single well includes a combination of both a soil screw (or tension tube) and a piling, as shown in FIG. 2H. In FIG. 2H, the front anchor 41/42 includes sleeves or channels 11A for the piles 17. The piles 17 extend through the sleeves 11A into the ground. The piles 17 include a hollow central bore, enabling a soil screw, tension anchor, or tension tube to pass through the pile and extend further into the ground. For example, where the ground includes dirt or soil 179, a soil screw or helical tension anchor 178A extends from the pile 17. Where the ground includes a rock formation 193, the rock formation is drilled to enable a tension tube 178B to extend from the pile 17 into the rock. The annular space between the tension tube 178B and the walls of the drilled rock formation may be filled with cement (as indicated in FIG. 2H) to further secure the tube to the ground. In embodiments of the invention, various combinations of piles, soil screws, tension anchors, and tension tubes may be used. Thus, as shown in FIGS. 2A and 2H, the anchor 41/42 is firmly secured to the ground, so that the anchor can react against the forces applied to the support frame 15 by the driver 13, in moving the pipe forward or backward, as described further below.

To retract the pipe from the borehole, the winch 44 applies tension to the cables 48, to move the collar 26 toward the rear support 39. This force reacts against the rear support 39. The compression members 40*a*, 40*b* pass this reactionary load back to the front anchor 41/42. The compression members 40*a*, 40*b* connect the front anchor and rear support to create a unified, rigid framework. The compression members themselves are rigid, and may take the form of strong beams or pipes that are finely mounted at both ends to the front anchor and the rear support, such as by inserting them into slots in the front anchor and rear support, and securing them with pins. One compression member is provided on each side of the pipe 12 to stabilize the support frame 15 and pass the load from the rear support to the front anchor.

The rear support 39 cooperates with the compression members to react against the driver 13 during retraction of the pipe. That is, the first function of the rear support 39 is to provide a load path to transmit force from the driver to the front anchor during pipeline retraction. The rear support 39 also provides a second function, elevating and supporting the pipeline 12 and aligning it with the front anchor 41/42 and the borehole 38. The front anchor 41/42 includes a passage 19 between the sections 41, 42 which receives the pipe 12 through the front anchor into the borehole. The rear support 39 aligns the pipe with this passage 19 and elevates the pipe to extend downwardly into the borehole.

Thus, according to embodiments of the invention, the support member for supporting the pipeline and the reactionary member for pipeline retraction are incorporated into the same structure, the rear support 39. Overall, the support frame 15 itself provides two functions. The frame 15 vertically and laterally supports the pipe to align it with the borehole, and also reacts against the force applied by the driver to move the pipe into or out of the borehole. This design provides a compact and robust structure and can eliminate other individual pieces of equipment normally used for pipeline support.

The rear support member 39 is held elevated by two legs 51, 53 which are adjustable in height. Each leg is received within a corresponding guide in the rear support 39. Two different guides—a vertical guide and a diagonal guide—are available for each leg, in order to provide several available configurations of the rear support, as shown in FIGS. 2D-F. In FIG. 2E, both legs 51, 53 are received within vertical guides 52a, 54a. In FIG. 2F, both legs are received within the diagonal guides 52b, 54b. In FIG. 2D, the first leg 51 is received within the diagonal guide 52b, leaving the vertical guide 52a empty, and the second leg 53 is received within the vertical guide 54a, leaving the diagonal guide 54b empty. These different configurations may be useful for different pipeline thrusting conditions. For example, when the pipeline 12 follows a curve, the configuration of FIG. 2D may be useful, to enable leg 51 to react against the lateral force of the pipeline 12. The orientation of FIG. 2F may also be used to provide additional lateral support. When the pipeline extends directly behind the rear support, without curving, the orientation of FIG. 2E may be used.

Additionally, while legs 51 and 53 are shown, it should be understood that pilings and/or soil screws (extending into the ground) may be used in place of the legs, to further secure the rear support. The legs or pilings/soil screws are also vertically adjustable within the guides 52a,b and 54a,b so that the height of the rear support 39 can be adjusted. The rear support can thus be positioned at the appropriate height according to the angle of the borehole. For a steeper borehole, the rear support can be raised, and for a more shallow borehole, the rear support can be lowered. The legs or pilings 51, 53 are provided with several spaced-apart holes 51H, 53H. The height of the legs can be adjusted by inserting a pin into the appropriate hole (see FIG. 2F).

The rear support 39 supports and stabilizes the pipeline 12 and guides it toward the front anchor 41/42 and the borehole. To accomplish this, the rear support 39 includes one or more vertical rollers 55 (providing vertical support and alignment for the pipe), and horizontal rollers 56a and 56b (providing horizontal support and alignment for the pipe). These rollers are all adjustable, to accommodate the pipe size and the configuration of the pipe thruster 11. The rollers are all mounted directly to the rear support 39. The pipeline passes over these rollers and through the rear support toward the front anchor, as shown in FIGS. 2A-B.

The front anchor 41/42 also includes rollers to stabilize and orient the pipe as it heads into the borehole 38. The front anchor includes one or more vertical rollers 57, positioned between the two structures 41 and 42, in the passage 19. The front anchor also includes one or more horizontal rollers 58a (mounted to structure 41), 58b (mounted to structure 42). These rollers are also adjustable. The rollers 55, 57, and 58a,b may be adjusted manually or automatically. When automated, the pipe rollers may be controlled remotely to position the pipeline with respect to the frame 15 and/or the borehole 38. The rollers may also be self-adjusting, such as by spring-loading the rollers to urge against the pipeline to lift the pipeline into the desired position. The rollers may be powered by hydraulic cylinders, air bladders, or other actuators.

In one embodiment, the pipe thruster 11 also includes one or more auxiliary hydraulic cylinders 59 coupled between the front anchor and the collar 26. The cylinders 59 may be firmly mounted to the front anchor at one end and releasably attached to the collar 26 at the other end. The cylinders 59 provide a backup force that can be used in addition to or instead of the driver 13, to lineally move the pipeline 12, or to break free the pipeline if it becomes stuck within the borehole. If the pulley systems of the driver 13 are inoperable, or if the pipe thruster 11 is stalled for a period of time, the hydraulic cylinders 59 can be operated to move the pipe 12 back and forth within the borehole, to prevent it from becoming stuck. The cylinders 59 can be quickly installed, and if there is not a need for them, they can be quickly removed for convenience.

According to one embodiment, the pipe thruster 11 also includes signaling equipment to safely communicate to personnel on the site. During the pipeline insertion operation, primarily night-time operations, safe communication for associated personnel can be crucial. As shown in FIG. 2G, the pipe thruster 11 includes safety signaling equipment, such as visual signal lights 78 and audio loudspeakers 79. The lights 78 and speakers 79 are positioned within, or mounted to, the rear support 39. The rear support 39 is elevated above the ground, so enables the signaling equipment to be clearly visible and audible further behind the pipe thruster 11. The pipeline 12 itself may continue for miles behind the pipe thruster, and thus the signaling equipment provides useful signals to the personnel down the line. In one embodiment, the lights 78 display yellow when the pipeline is stopped, green when it is moving forward, and red when it is moving in reverse, out of the borehole. The lights can also be flashed to indicate emergency situations or contingencies. The speaker can provide announcements, or whistles or other cues.

A complete cycle of operation of the pipe thruster 11 takes place as follows. The collar 26 is disengaged from the pipe 12, and the second pulley system is operated to pull the collar 26 rearwardly away from the borehole, to the rear support 39. At that position, the collar 26 is energized to grip the pipe 12. The collar itself may include a plurality of radially placed friction shoes 98 (see FIG. 3L) that are driven toward the pipe to grip the outside surface of the pipe. These friction shoes may be driven by hydraulic cylinders and forced inwardly into frictional engagement with the pipe. The first pulley system is then operated to tension the cables 45 and pull the collar 26, and with it the pipe 12, toward the front anchor. The collar 26 is moved forward until it reaches the front anchor 41/42. This movement of the collar 26 moves a length of the pipe into the borehole, equal to the length between the two collar positions. The collar is then released from the pipe and the cycle is repeated. To withdraw the pipe from the borehole, the cycle is repeated but with the collar engaged at the front position and disengaged at the rear position.

During operation, if the pipe 12 gets stuck or if the winches 43, 44 need maintenance or inspection, the auxiliary hydraulic cylinders 59 may be installed and operated to move the collar 26 back and forth, with the collar energized to grip the pipe, to prevent the pipe from becoming stuck in the borehole. The cylinders 59 may also be used to provide extra force on the pipe, in addition to the winches.

As demonstrated, the driver 13 is a bi-directional driver that can readily move the pipe in either direction, into or out of the borehole, without pausing for disassembly and reassembly.

In one embodiment, the length of the movement of the collar 26 matches the stroke of the drilling rig 10 at the opposite end of the borehole. That is, the distance that the collar moves with the pipe between its rear and forward positions, to either insert the pipeline into the borehole or to remove it, is the same distance as the stroke of the drilling rig removing the drill string at the opposite end of the borehole. In one embodiment, this length is about 31 feet. As a result, both systems can be coordinated to work together at the same time, and neither system must be paused mid-stroke to wait for the other system to be re-set. This can save valuable time at the drilling site.

A pipe thruster 111 according to another embodiment of the invention is shown in FIGS. 3A-3I. The pipe thruster 111 includes a support frame 15, first and second collars 26 and 62, and a bi-directional driver 13. The support frame 15 includes a front anchor 41/42, a rear support 39, and compression members 40a, 40b. In this embodiment, the driver 13 includes four hydraulic cylinders, rather than first and second pulley systems as described above with pipe thruster 11. The four hydraulic cylinders operate together to move the two collars 26, 62 toward and away from the borehole. In particular, the hydraulic cylinders can be coordinated to provide a continuous, or nearly continuous, movement of the pipeline into or out of the borehole, as described in further detail below.

Referring to FIGS. 3A-3C, the driver 13 includes four dual-rod hydraulic cylinders 60A, 60B. Two cylinders 60A are mounted to the first collar 26, and two cylinders 60B are mounted to the second collar 62 (see FIG. 3C). Each cylinder is double-ended, meaning that it includes two rods 61, one extending out of each end of the cylinder. The rods of each pair of facing cylinders 60A, 60B are attached to each other at coupling 65. At the opposite ends, the rods of cylinders 60A are attached to the front anchor 41/42, and the rods of the cylinders 60B are attached to the rear support 39.

The forward cylinders 60A move the first collar 26 over the rods 61, between the front anchor 41/42 and the coupling 65. The rearward cylinders 60B move the second collar 62 over the rods, between the coupling 65 and the rear support 39. Each collar can be energized to grip the pipe 12 and then the respective cylinders can be operated to move the collar either forward or backward, toward or away from the borehole. With the two collars and the two pairs of cylinders in series, the pipe can be moved over the entire length of the rods 61, from the rear position of the second collar 62 to the forward position of the first collar 26, or in reverse. Additionally, the dual-rod cylinders 60 can move in either direction with equal force and velocity over the rods 61. Thus there is no loss of force or velocity in reversing the driver to withdraw the pipe from the borehole. The cylinders 60 simply traverse the rods 61 in the opposite direction, with equal force.

The connection of the cylinder pairs in series at coupling 65 creates a long length of rods 61 over which the cylinders move. To provide additional support to the cylinders and rods, the collars 26, 62 are each fitted with a torque arm 63. Each torque arm 63 is firmly mounted to the respective collar, and then slidingly rests at each end on the two torque arms 40a, 40b. The torque arm 63 can then move with the collar as it traverses the rods 61. As shown in FIG. 3C, in one embodiment, the torque arm 63 is fixed to the top side of the collar 26, and is provided with rollers 64 that ride over and bear on the compression members 40a, 40b. The compression members support the rollers and the load from the torque arms. The torque arms 63 push against the compression members to resist rotation of the pipeline 12 during operations, thereby protecting the cylinders 60 from this rotation. The torque arms thereby act as anti-torque members, providing torsional stability to the collar, and reducing the lateral or twisting stress applied on the cylinders 60.

The pipe thruster 111 also includes pilings that support the front anchor 41/42 and secure it to the ground, adjustable legs 51 and 53 that support the rear support 39, and rollers 57, 58a, 58b, 55, and 56a, 56b on the front anchor and rear support, for guiding and aligning the pipe 12 as it moves into or out of the borehole 38.

In one embodiment, the cylinders 60A, 60B have equal area and displacement on either side, such that the cylinders can apply the same force and speed in either direction of travel. In either direction of travel, the cylinder retracts over the rods 61 to act on the respective collar, rather than pushing or extending the rods. Since the cylinders always operate by retracting, whether moving the collars forward or in reverse, the same force is applied regardless of the direction of travel.

FIGS. 3D-3I show various operational modes of the pipe thruster 111. In FIGS. 3D-3E, the pipe thruster 111 moves the pipeline 12 continuously forward into the borehole, in the direction of arrows F. In FIG. 3D, the second collar 62 is unsecured and traverses freely over the pipeline 12, by activating the hydraulic cylinders 60B, which are energized on the side 66 of the cylinders. The second collar 62 moves over the pipeline in the direction of arrow G to rest in its aft position 67. Simultaneously, the first collar 26 is secured to the pipeline 12 and is moved from its aft position 67 forward in the direction of arrow F to its forward position 68. The cylinders 60A are energized on the side 66 of the cylinders to move the collar 26 and the gripped pipeline forward.

After the first, secured collar 26 has moved to its forward position 68, and the second, unsecured collar 62 has moved to its aft position 67, the function and direction of the collars are reversed, as shown in FIG. 3E. The first collar 26 is released from the pipeline 12, and the opposite side 66 of the cylinder 60A is energized to move the collar 26 rearward toward its aft position 67, in the direction of arrow G. The collar 26 moves freely over the pipeline to its aft position. Meanwhile, the second collar 62 is energized to grip the pipe, and the cylinders 60B are energized at side 66 to move the second collar 62, and with it the pipe, forward in the direction of arrow F toward the forward position 68. Once the second collar 62 has reached its forward position, and the first collar has reached its rear position, the sequence is repeated.

This sequence can be repeated to provide a continuous forward movement of the pipeline 12 into the borehole 38. The cylinders move forcefully over the rods in a coordinated sequence to move the pipe forward, with each collar alternatively gripping the pipe and moving it forward. The sequence can be described as a hand-to-hand or inchworm-type movement of the two collars, to continually move the pipe forward.

FIGS. 3F and 3G illustrate the reverse sequence, which can be used to continuously withdraw the pipe from the borehole, in the direction of arrow G. As shown in FIG. 3F, in this sequence, the first collar 26 is initially unsecured, moving freely over the pipeline 12, from its aft position 67 to its forward position 68. Simultaneously, the second collar 62 is secured to the pipeline 12, and the hydraulic cylinders 60B are activated to forcefully drive the collar 62 and the pipe rearward from the forward position 68 to the aft position 67. As shown in FIG. 3G, the second collar is then released from the pipe and moved freely over the pipe toward its forward position 68, while meanwhile the first collar 26 is secured to the pipe and driven by the cylinders 60A from the forward position 68 to the aft position 67. The driver 13 can thus operate the cylinders and the collars 26, 62 to continuously withdraw the pipeline from the borehole.

The above process, whether moving the pipeline into or out of the borehole, can be fully automated to achieve a seamless non-stop motion and force to the pipeline 12. A controller can be provided with control instructions to send signals to the cylinders 60A, 60B and to the collars 26, 62 to operate them in tandem in the hand-to-hand motion described above. The controller can also halt the process as part of a scheduled pause or in emergency situations.

FIGS. 3H and 3I show yet another mode of operation of the pipe thruster 111. In this mode of operation, the two collars 26, 62 are operated in unison to generate a combined thrusting force in the same direction on the pipeline 12. In FIG. 3H, this combined force is used to drive the pipeline into the borehole, in the direction of arrow F. In this sequence, the two collars 26 and 62 are released from the pipeline and moved freely over the pipe to their aft positions 67. The two collars are then secured to the pipe, and the cylinders 60A, 60B are energized at side 66 to simultaneously drive the two collars forward, in the direction of arrows F, to their forward positions 68. At the forward position 68, the collars 26, 62 are released from the pipe and the sequence is repeated. In this mode, the cylinders 60A, 60B work together to create a combined force on the pipe. The movement of the pipe is not continuous, as the pipe rests stationary while the two collars are both moved, unsecured, back to their aft positions 67. The process is therefore slower than the hand-to-hand continuous process described above, but the force applied to the pipe is doubled. This sequence can be used when additional force on the pipe segment is necessary, such as when the pipeline becomes stuck.

In FIG. 3I, the two collars and the cylinders are operated in unison to withdraw the pipeline from the borehole, in the direction of arrow G. The collars 26, 62 are released from the pipe at their rear positions 67, and are moved freely over the pipeline 12 to the forward positions 68. The collars are then energized to grip the pipe, and the hydraulic cylinders 60A, 60B are energized at side 66 to drive the collars to their aft positions 67. At the aft position, the collars are released, and the process is repeated.

The simultaneous use of both collars 26 and 62 increases the force applied to the pipeline 12 without increasing the stress on the pipeline, or any protective coating that is applied to the pipeline.

In one embodiment, as shown in FIGS. 3J-3K, alternate compression members 123*a*, 123*b* are provided in place of compression members 40*a*, 40*b*. In this embodiment, the two pairs of hydraulic cylinders 60*a*, 60*b* are mounted to the compression members 123*a*, 123*b*. The compression members are each provided with a front connection mount 124, a middle connection mount 125, and a rear connection mount 126. The connection mounts are firmly secured to the top of the compression members. The front connection mount 124 may also be mounted to the front anchor 41, and the rear connection mount 126 may also be mounted to the rear support base 39. The front end of the rod 61 of the front cylinders 60*a* is connected to the front connection mount 124, and the rear end of the rod is connected to the middle mount 125. The front end of the rod 61 of the rear cylinders 60*b* is connected to the middle mount 125, and the rear end to the rear mount 126.

The pairs of cylinders 60*a*, 60*b* urge against these connection mounts 124, 125, 126, and thereby urge against the compression members 123*a*, 123*b* in order to move the collars 26, 62. The cylinders 60*a*, 60*b* are not directly connected to each other in the middle, but rather each is connected to the middle connection mount 125 on the compression members 123*a*, 123*b*. The compression members provide a stable and rigid mount for the cylinders 60*a*, 60*b*. In this embodiment, the compression members 123, 123*b* are moved inwardly toward the collars, under the cylinders 60*a*, 60*b*, as compared to the embodiment shown in FIG. 3A. Additionally, the torque arms 63 from FIGS. 3A-3B may be omitted in the embodiment of FIGS. 3J-3K, as the collars 26, 62 can react directly against the compression members through the cylinders and connection mounts.

As shown in FIG. 3L, the collars 26, 62 may be provided on each side with rollers 128 that follow tracks 129 along the compression members 123*a*, 123*b*. As shown in this front view, in one embodiment, the compression members 123*a*, 123*b* are I-beams, that is, having an I-shaped cross section with top and bottom flanges. The tracks 129 are positioned below the top flanges and are supported by vertical support members 130. The roller 128 is captured between the top flange and the track 129. The rollers 128 support the collars 26, 62 and resist torque applied to the collars. An anti-friction material may be provided along the top of the support member 130 to provide a low-friction surface for the roller 128. This material may be an ultra-high molecular weight polymer such as nylon. In another embodiment, the rollers may ride along the top surface of the compression members, above the top flange.

A pipe thruster 211 according to another embodiment of the invention is shown in FIG. 4. In this embodiment, the driver for the pipe thruster 211 is a traction driver, which includes two traction track assemblies 90 mounted to a track frame 96. In this embodiment, the rear support and the compression members are combined into the track frame 96. The track assemblies drive the pipeline 12 into or out of the borehole 38. Each traction track includes a revolving traction chain 95, fitted with a plurality of traction shoes 93 that engages the pipeline 12. Each traction driver is further fitted with a plurality of drive sprockets 91, traction chain idlers 92, and compression cylinders 94.

During operation, the compression cylinders 94 are energized, compressing the traction shoes 93 to the pipeline 12. The gripping surface of the shoes 93 conforms to the outer contour of the pipe 12, to firmly grip the pipe and increase the surface area contact between the shoe and the pipe. As the shoes 93 directly grip the pipe, no collar is necessary. The drive sprockets 91 are driven by hydraulic or electric motors, traction wheels, or other means well known by those of ordinary skill in the art, simultaneously revolving the traction chains 95 in the desired direction of travel of the pipeline 12, either forward or in reverse, as indicated by directional arrows F and G. Additional traction track assemblies 90 and traction shoes 93 may be required for larger diameter pipelines 12. Further, a plurality of traction wheels could substitute as a traction driver. In one embodiment, the traction track has variable speed and force controls, and is capable of being operated to apply continuous force and motion to the pipeline, whether in forward or reverse.

A pipe thruster 511 according to another embodiment of the invention is shown in FIGS. 5A-5F. The pipe thruster 511 includes a bi-directional driver 513 that acts against a support frame 515 to move the pipe 12 into or out of the borehole. In this embodiment, the support frame 515 includes a liftable thrust frame 571 and an anchor platform 570. The anchor platform 570 incorporates both front and rear anchors into one integrated structure that rests along the ground. The compression members from above-described embodiments are integrated into the liftable thrust frame 571, which supports the driver 513. The thrust frame 571 is lifted to align the pipe 12 with the borehole. The thrust frame 571 is coupled to the anchor platform 570 to transmit forces from the driver 513 to the anchor platform 570 and into the ground. These elements of the pipe thruster 511 are described in further detail below.

The anchor platform 570 includes a front anchor 541 and a rear anchor 539. Each anchor includes a cross-beam 573 that passes through a corresponding passage or slot 574 in the anchor platform 570. The slot 574 is sized to match the cross-sectional shape of the beam 573. In the embodiment shown, the beam and slot have rectangular cross-sections, to prevent the beam from rotating with respect to the platform. The beam 573 extends to each side of the platform 570 and includes one or more downward passages or slots 575 that pass through the beam toward the ground. These slots 575 are sized to receive pilings 517 that are driven into the ground to secure the anchor platform 570 to the ground. The pilings 517 may also be replaced with soil screws or combinations of pilings and soil screws. The anchor platform 570 is firmly secured to the ground by the two anchors 541, 539. In other embodiments, more than two anchors may be provided. In another embodiment, slots 575 may also be incorporated within platform 570, without cross-beam 573 and slot 574.

As shown in FIGS. 5A-C, the compression members of above-described embodiments are incorporated into an integrated liftable thrust frame 571. The bi-directional driver 513 bears against the thrust frame 571, which in turn bears against the anchor platform 570 and the front and rear anchors that are secured to the ground. The thrust frame 571 is secured to the anchor platform 570 at both ends of the thrust frame. At the front end, near the borehole, the thrust frame 571 is secured to the anchor platform 570 by a hinge 572, which allowed the thrust frame 571 to rotate with respect to the anchor platform, about the axis of the hinge. This enables the thrust frame to be positioned at an angle α with respect to the platform 570. In one embodiment, the angle α is adjustable between 0 and 15 degrees. The second end of the thrust frame 571 is secured to the platform 570 by a pair of extendable rear legs 551 (only one of which is shown in FIG. 5C). In the embodiment shown, the rear leg 551 is a hydraulic cylinder, which can be retracted or extended to adjust the angle α. The thrust frame 571 includes a rear wing 588 on each side of the frame 571 where the rear legs 551 are connected to the frame.

The bi-directional driver 513 is mounted to the thrust frame 571 and reacts against the thrust frame 571 to drive the pipe 12 forward or backward. The bi-directional driver 513 includes first and second collars 526, 562 that are driven forward and back by pairs of hydraulic cylinders 560A, 560B that are mounted to the collars. The cylinders extend and retract over rods 561, which are firmly mounted to the frame 571 at connection mounts 524, 525, and 527.

The thrust frame 571 may also include one or more rollers 555 or other supports for guiding the pipe 12 into the thrust frame 571. Additionally, the collars 526, 562 may be supported on rollers 576 (see FIG. 5F) along the thrust frame 571.

A pipe thruster 611 according to another embodiment is shown in FIGS. 6A and 6B. The pipe thruster 611 includes a liftable thrust frame 671 and an anchor platform 670. Reactionary forces from the bi-directional driver 613 are passed from the thrust frame 671 to the anchor platform 670 through a pair of hinge connections 672 (one of which is shown in FIG. 6B). The anchor platform 670 includes passages for anchor beams 673. The beams 673 pass through sleeves 690 spanning the anchor platform 670. In one embodiment, the cross-beams 673 are slidably received in the sleeves 690 such that the anchor beams can be assembled to the anchor platform 670 on-site (i.e., the beams can be transported to the job site separately from the anchor platform and pipe thruster 611 and then assembled on site by sliding the beams into the sleeves and securing it thereto, such as by welding). Anchors such as piles, soil screws, or helical tension anchors 678 pass through the beams 673 into the ground 627. The tension anchors 678 may be tensioned by a nut 606 above the beam 673, or by a jack assembly 607. The tension anchors 678 force the platform 670 downward. In one embodiment, the tension anchors 678 include a shaft portion and one or more helical bearing plates connected to the shaft portion for engaging the ground. The shaft portion of the tension anchors may have any suitable shape, such as square, rectangular, or tubular. The helical bearing plates may include split circular plates connected to the shaft. In one embodiment, the helical bearing plates extend circumferentially aroung the shaft and have split ends longitudinally spaced apart along the shaft (see FIG. 2H). FIG. 6B depicts three tension anchors 678 having a single helical bearing plate 695A, two helical bearing plates 695B, and three helical bearing plates 695C, respectively. However, it will be appreciated that the tension anchors 678 may include any suitable number of helical bearing plates. The helical bearing plates are configured to secure the pipe thruster to the ground by increasing the tension force on the helical bearing plates. More specifically, the helical bearing plates are configured to secure the pipe thruster to the ground by increasing the "plug" (i.e., the vertical column of soil above the helical bearing plates) that must be displaced to move the pipe thruster, as compared to conventional threaded ground screws.

Cleats 687 may be employed to engage and react laterally against the earth 627. In one embodiment, the cleats 687 are comprised of a tapered protrusion extending into the ground. A plurality of cleats 687 may be provided along the entire length of the anchor platform 670 or may be concentrated in particular portions of the anchor platform, such as proximal the tension anchor 678 attachment points to the anchor platform 670.

As shown in FIG. 6B, a hydraulic cylinder 696 may be provided to lift the thrust frame 671 above the anchor platform 670. Once the thrust frame is elevated, a bolster or support 692 may be secured between the thrust frame 671 and the anchor platform, near the rear end of the thruster, to retain the thrust frame in its elevated position. The support 692 is removable to adjust or lower the thrust frame. Also shown in FIG. 6B is a power unit 694, which may be integrated into the anchor platform 670, such as at the rear end of the platform. In other embodiments, the power unit may be provided separately.

In one embodiment, the collars (such as collars 526, 562 in FIGS. 5A-F) include gripping shoes that are activated to grip the pipe 12. Various features of the collar and the gripping shoes are shown in FIGS. 7-11. In one embodiment, as shown in FIGS. 10A and 11, a collar 19A includes two hydraulic cylinder assemblies 44A and 44B located in the top quadrants of the collar. The cylinder assemblies are shown in more detail in FIG. 11. The cylinder assemblies 44A, 44B each include a hydraulic cylinder 44C with a cylinder rod 107 coupled to a gripping shoe 42. The gripping shoe 42 is shaped to match the curvature of the outer surface of the pipeline 25. The surface of the gripper shoe 42 that faces the pipe includes a high-friction surface material 46 for firmly gripping the pipeline 25. The hydraulic cylinder 44C may be an air cylinder, air bladder, or other actuator. The cylinder is operated to move the gripping shoe 42 downward to engage the pipeline 25, which passes through the center of the collar 19A (shown in FIG. 10A). The gripping shoes 42 may be referred to as active gripping shoes, as they are activated by the hydraulic cylinders 44C.

In one embodiment, the hydraulic cylinders 44A, B are mounted to the collar by two spherical bearings 58, one at each end of the cylinder 44C, as depicted in FIG. 11. The bearings are provided to accommodate the tolerances and stresses imposed on the system in operation. Tolerances within the collar 19A and the hydraulic cylinders 44A and 44B need to be loose in order to accommodate various weather conditions, operating modes, and field conditions, to enable the system to continue to operate without jamming. During thrusting, lateral forces K may be imparted on the cylinder rod 107, which could apply stresses to the cylinder seal 106. The bearings 58 reduce this lateral load condition and potential seal failure. The bearings 58 enable the cylinder 44C to wobble and center itself with respect to the shoe 42 that grips the pipe. The bearings 58 allow the cylinder and associated gripping shoe to adjust to the outer surface of the pipeline 25, even when the pipeline is off-center, vibrated, or non-uniform. In FIG. 11, loose tolerances are indicated at 109 between the cylinder wall 114 and the outer sleeve 108. Any suitable flex structure may be used in place of the bearings 58, to allow the cylinder 44C to freely move to avoid a bending moment on the cylinder.

Referring again to FIG. 10A, two cylinder assemblies 44A, 44B are shown in the upper quadrants of the collar 19A, each activating a gripping shoe to grip the pipeline 25. In another embodiment, a single cylinder (not shown) drives both active gripping shoes, rather than supplying a separate cylinder for each gripping shoe.

With continued reference to FIG. 10A, two fixed gripping shoes 54 are located in the lower quadrants of the collar 19A. The fixed gripping shoes 54 are connected to the collar by a pin 56. The pin enables the shoes 54 to rotate about the axis of the pin (in the direction of arrow T) in order to adjust to receive the pipeline 25, for greater contact or seating between the shoe and the pipe. This results in increased contact area for greater thrusting forces against the pipe. The shoes 54 may be spring-loaded or weighted about the pin 56 to bias the shoes 54 into a symmetric position about the pin 56 and the pipeline 25. Although the shoes 54 rotate about the pins 56, the shoes 54 are referred to as "fixed" because the pin 56 is fixed to the collar 19 and does not move the shoes 54 toward or away from the pipeline with a hydraulic cylinder, like the upper active gripping shoes. The two cylinder assemblies 44A, B, when hydraulically energized, extend and move the gripper shoes 42 radially inwardly to contact the pipe. The force applied by the cylinders pushes the pipeline up against the fixed gripping shoe 54 in the opposite quadrant.

Figure 10C:
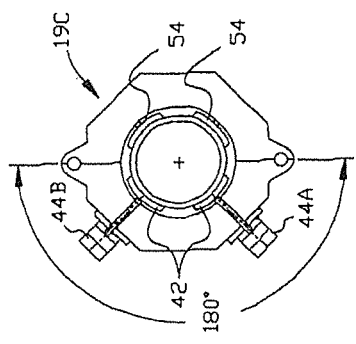
FIG. 10A is a partial front and partial cross-sectional view of a collar for a pipe thruster, according to an embodiment of the invention, with two enlarged inset areas.
FIGS. 10B, C, D, and E are a collection of figures showing a collar for use in a pipe thruster, according to an embodiment of the invention.
FIG. 10F is an end view of a collar according to an embodiment of the invention, showing collar separation.
FIG. 10G is an end view of a collar according to an embodiment of the invention, showing collar separation.
Figure 10E:
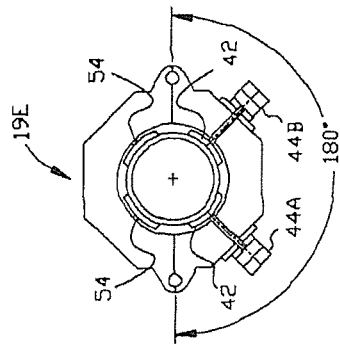
Figure 10B:
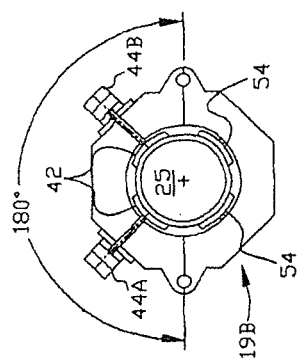
Figure 10D:
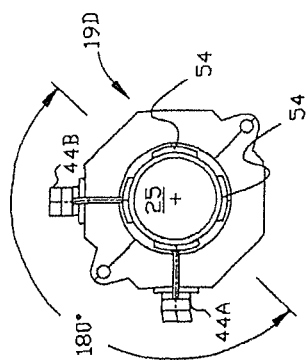

The two active gripping shoes 42 (shown in FIG. 11) are located in the two upper quadrants of the collar, as shown in one embodiment in FIG. 10A. In other embodiments, they may be located in any two other adjacent quadrants. That is, they may be located in the two left quadrants, the two lower quadrants, the two right quadrants, or the two upper quadrants. A few different options for the collar (19B, 19C, 19D, and 19E) are illustrated for clarity in FIGS. 10B, 10C, 10D, and 10E. The two active gripping shoes 42 (with their corresponding cylinders 44A, 44B) are both located within the same 180-degree hemisphere of the collar. The fixed gripping shoes 54 are positioned opposite the active gripping shoes 42, such that each active gripping shoe 42 presses the pipeline 25 against the fixed shoe 54 in the opposite quadrant. The active gripping shoes 42 press the pipeline 25 against the fixed gripping shoes 54 such that the pipeline 25 is firmly gripped by all four gripping shoes.

Referring again to FIG. 10A, the pipe thruster includes two I-beam guides 80, one on each side of the collar 19A. The I-beam guides 80 are mounted to the floor of the frame 10. The collar itself is supported by four rollers 76, two on each side of the collar (only one on each side shown in FIG. 10A). The rollers 76 fit within a channel 78 formed by the I-beam guide 80. The I-beam guide 80 reinforces the path of the rollers 76 to guide the collar 19A in a straight path along the frame 10. The two I-beams 80 on each side of the frame work to prevent rotation of the collar as it moves along the frame.

Referring again to FIG. 10A, in one embodiment, the channel 78 includes one or more spacers 79 for snugly capturing the roller 76 inside the channel and preventing material deformation. The spacer 79 may be formed of an anti-friction material to reduce friction for the roller 76. In one embodiment, the spacer 79 includes a heat-treated or high strength steel or other material. Additionally, in one embodiment, the roller 76 includes a flange which traps the roller 76 within the channel 78 of the I-beam guide 80. The flanged rollers support the collar 19A vertically, laterally, and torsionally.

FIG. 10F shows a collar 19F according to an embodiment of the invention. The collar 19F is divided into two pieces that are separable to open the collar to receive or remove the pipeline 25. In one embodiment, the collar 19F includes an upper portion 156a that is attached at a hinge 163 to a lower portion 156b. The upper portion 156a can be rotated about the hinge 163 to expose the central cavity 157 of the collar 19F. A hydraulic cylinder 165 may be provided to assist in lifting and rotating the upper portion 156a, or this movement may be done manually or by other actuators (such as a crane). The upper portion 156a may be rotated to an open position as shown in FIG. 10F, or entirely removed from the lower portion 156b. When the pipeline 25 has been inserted into the cavity 157, the upper portion 156a is moved back into position and secured to the lower portion 156b by mating connectors 164. In one embodiment, the connectors 164 include openings that align and receive a pin to fix the upper portion 156a to the lower portion 156b. The connectors 164 may provide a quick-pin disconnection. Other types of mechanical fasteners may be used, such as nuts and bolts. The collar 19F can be easily opened or closed to allow access to the pipeline for repair, service, or pipeline insertion or removal. In FIG. 10F, the collar 19F is split about a horizontal axis 156.

FIG. 10G shows a collar 19G according to an embodiment of the invention. The collar 19G is split about a vertical axis, into two side portions 167a, 167b. Each side portion is connected to the lower portion 156 of the collar by a hinge 163a, 163b, respectively, and the side portions may be raised and lowered by hydraulic cylinders 165 (or by other actuators, or by manual operation). The two side portions can be connected and released from each other by mating connectors 164. The rotation of the side portions 167a, 167b exposes the collar cavity 157 to access the pipeline 25.

In one embodiment, as shown in FIG. 7, the pair of upper gripping shoes 47 spans less than a full 180°. That is, as the upper gripping shoes 47 extend downwardly from the top, they reach their respective end 47A before coming to the horizontal centerline C of the cavity. This relief in the shoes provides clearance for the widest part of the pipeline to move through the cavity. The gripping shoes may be chamfered at their ends 47A to provide this relief near 180°. In one embodiment, this relief is about 10° on each side.

As shown in FIGS. 8 and 9A, in one embodiment, a collar 19″ includes a V-block or roller 49 that is used to lift the pipeline 25 into the collar cavity, before activation of the gripping shoe cylinders 44A, B. The roller 49 is positioned below the pipeline 25 and is connected to a hinged arm 50 that is driven in an upward arc by an attached hydraulic cylinder 51. This movement drives the roller upwardly and moves the pipeline 25 into a proper seating against the gripping shoes. Then, the cylinders 44 are energized to drive the active gripping shoes into engagement with the pipe. With the pipe already lifted and centered, the cylinders 44A, B can then drive the gripping shoes 42 directly into alignment with the pipeline. The roller 49 lifts the pipeline straight up, and then the cylinders 44 drive the gripping shoes inwardly at 45° angles toward the pipe. The roller 49 thus ensures that the gripping shoes are all properly aligned with the pipeline. The roller or V-block may be provided behind or in front of the collar, as shown for example in FIG. 9A.

Additionally, the roller may be used when the collar is moved along the pipeline to reset the position of the collar. As shown in FIG. 7, without the benefit of the roller 49, the lower portion of the pipeline 25 rests against the lower portions 52 of the collar cavity, due to gravity. As the collar travels over the pipeline to its starting position, the lower portion of the collar can scrape against the pipeline, damaging the pipeline, the pipeline outer coating, and/or the collar. Accordingly, the roller 49 can be lifted partially, to hold the pipeline within the cavity above the lower gripping shoes and below the upper gripping shoes. In this way, as the collar is moved along the pipeline to re-set the position of the collar, the pipeline does not rub or scrape against the gripping shoes. Alternatively, the retracted position of the roller 49 can be set to be above the retracted position of the lower shoes, so that the roller need not be energized in order to retain the pipeline above the collar to prevent rubbing or scraping.

Figure 9C:
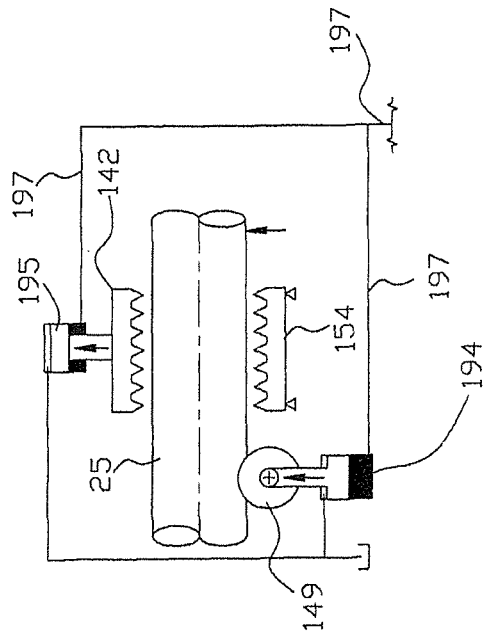
FIG. 9C is a side schematic view of the collar of FIG. 9B, with the roller mechanism in an engaged position.
Figure 9B:
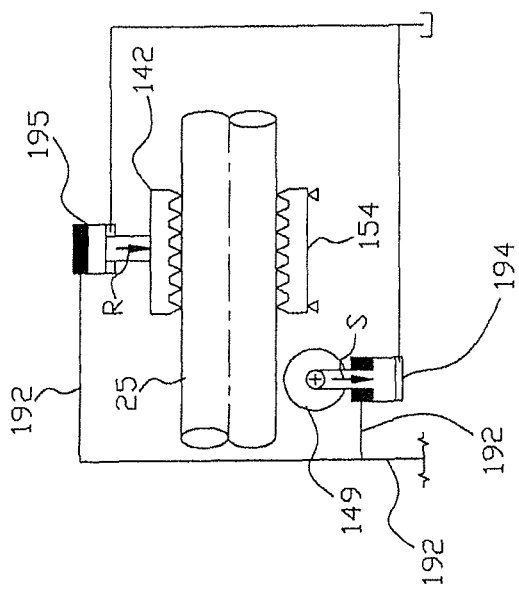
FIG. 9B is a side schematic view of a collar having a roller mechanism, shown in a retracted position, according to an embodiment of the invention.

An actuator such as a roller 149 according to another embodiment is shown schematically in FIGS. 9B and 9C. As before, the roller actuator 149 is used to lift the pipeline 25 out of contact with the lower gripping shoes of the collar. In this embodiment, the collar is shown having lower fixed gripping shoes 154 and upper active gripping shoes 142.

The roller 149 is coupled to hydraulic circuits 192 and 197, which are designed to operate the active gripping shoes 142 and the roller 149 together. The roller 149 is coupled to a hydraulic cylinder 194, and the gripping shoes 142 are coupled to a hydraulic cylinder 195. The circuits 192, 197 are coupled to these cylinders. In one embodiment, the circuits 192, 197 are hydraulic circuits. In FIG. 9B, the circuit 192 is activated to extend the cylinder 195 and retract the cylinder 194. This movement causes the upper active shoe 142 to press against the pipeline 25, thereby pressing the pipeline 25 against the lower fixed shoe 154. At the same time, the cylinder 194 retracts the roller 149 away from contact with the pipeline. The collar can be used in this position to thrust the pipeline.

In FIG. 9C, the circuit 197 is activated to reverse the cylinders—extending the cylinder 194 and retracting the cylinder 195. The cylinder 195 retracts the upper active gripping shoe 142 away from the pipeline. At the same time, the cylinder 194 extends the roller 149 and presses it up against the pipeline 25, lifting the pipeline 25 out of contact with the lower fixed gripping shoe 154. In this position, the pipeline 25 can move freely through the central cavity of the collar without scraping against the collar surfaces.

In various embodiments, the leading edges of the collar and gripping shoes are coated with a protective coating in order to cover any sharp edges. Referring to FIGS. 7 and 9A, the collar has leading edge 19L, and the upper shoes 47 include leading edges 47L (the lower shoes are not shown, for clarity). These leading edges 19L and 47L are coated with a protective coating such as a rubber or plastic material. The protective coating provides a smooth edge, so that the collar and shoes do not scratch or damage the outer surface of the pipeline as the pipeline moves through the collar. Additionally, the outer surface of the pipeline itself may also be coated with a rubber or plastic material to protect the pipeline. In another embodiment, a bumper or guide may be attached to the leading edge of the collar and shoes. In one embodiment, the bumper is made of high-density polyethylene.

Various shoes 42 and 47 may be provided with different curving surfaces 46, to match the diameters of various pipelines of different sizes. In various embodiments, the shoes may match pipes of about 30 inches in diameter or smaller.

To maintain true axial alignment of both collars (such as collars 19A in FIG. 10A) to pipeline 25, during a pipeline thrusting or retraction operation, prior to where one collar is free to travel over the pipeline 25, and prior to the other collar being in gripping mode to the pipeline, a means for radially adjusting the fixed gripping shoes 54 is provided. The slight radial adjustment of the fixed gripping shoes 54 can be accomplished by simply replacing the concentric pin assembly 56 with an adjustable eccentric pin, bushing, or other suitable member. The eccentric pin or bushing may be driven between an engaged ("extended") position and a relaxed ("retracted") position by mechanism, such as a hyrdraulic, electric, or pneumatic system, or any other suitable apparatus. In an embodiment in which the gripping shoes are connected to collar by an eccentric pin or bushing and are driven between an engaged position and a relaxed position, the gripping shoes may be referred to as "passive" gripping shoes. The gripping shoes 54 are passive in the sense that the gripping shoes are not drivably applying force to the pipe, like the active gripping shoes described above; instead, the passive gripping shoes are radially displaced to an extended position by an eccentric pin or bushing driven by a mechanism. Thus, when the passive shoes are in the extended position, the passive shoes supply a reactionary force against the pipe rather than a mechanically supplied force, such as by a hydraulic cylinder.

As shown in the above figures, the collar may utilize hydraulic cylinders to extend gripping shoes to grip the outer surface of the pipeline. In another embodiment, as shown in FIGS. 12, 13A-C, and 14A-C, the collar 326 utilizes a bladder assembly 320 to grip the outer surface of the pipeline 307. The collar 326 moves along the thrust frame 371 of the support frame 315, to move the pipeline toward or away from the borehole.

Figure 12:
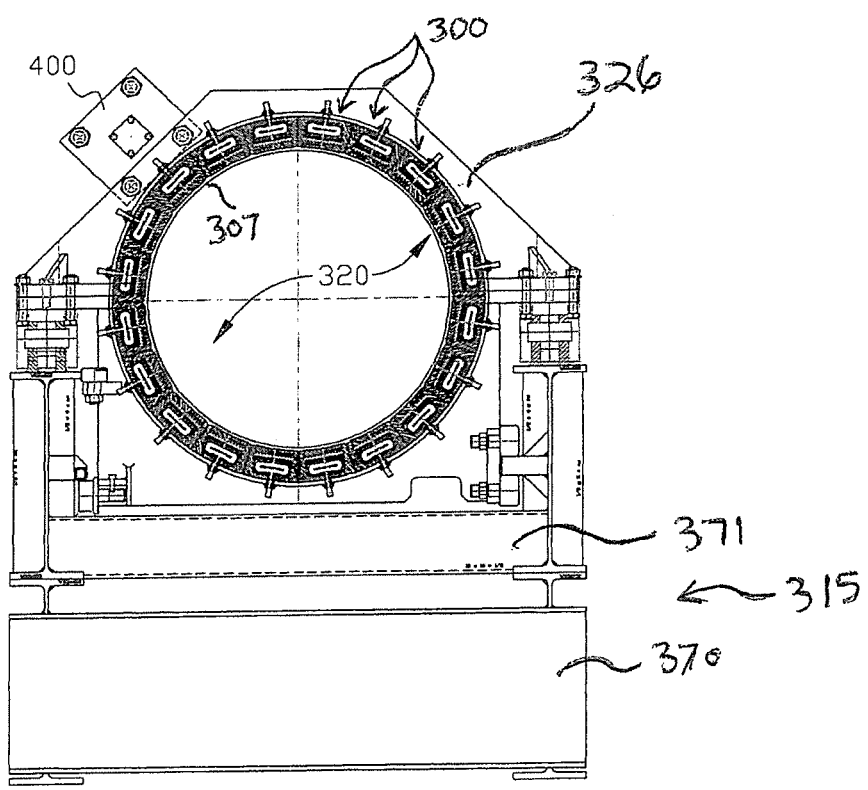
FIG. 12 is a cross-sectional view of a pipe gripping collar comprising an inflatable gripping assembly.

As shown in FIG. 12, the bladder assembly 320 includes a plurality of individual bladders 300 which are positioned around the outer circumference of the pipeline 307. Each bladder 300 has a length that extends axially along the length of the pipe, as shown in FIGS. 13A, 13B, 14A, and 14B. FIGS. 13A-C show the bladder 300 in a retracted position, such that the bladder is not gripping the pipe, and FIGS. 14A-C show the bladder 300 in an inflated or extended position, such that the bladder 300 is gripping the pipe. In one embodiment, the bladder assembly 320 may include at least four bladders, such as between four and eight bladders. In another embodiment, the bladder assembly may include at least 10 bladders. In yet a further embodiment, the bladder assembly may include at least 20 bladders. It will be appreciated, however, that the number of bladders may vary according to the specific operating conditions of the pipe thrusting apparatus, such as pipe diameter, pipe weight, and the composition of the surface coatings on the pipe. Moreover, the number of bladders may vary according to the operating parameters of the mechanism driving the bladders between the inflated and deflated positions, such as hydraulic fluid pressure. Accordingly, the invention disclosed herein is not limited to the ranges disclosed above.

Referring first to FIGS. 13A-C, the bladder 300 is nested to a formed shoe 302 on the side of the bladder that faces the pipeline 307. The shoe 302 is in turn contacted to a thrust plate 304, which is in turn secured to a gripping surface 305. The gripping surface is the surface that ultimately grips the pipeline 307. A bond layer 310 firmly secures the gripping surface 305 to the thrust plate 304. In the deflated position shown in FIG. 13A-C, the bladder 300 is deflated, and the gripping surface 305 is retracted away from the pipeline, leaving a gap 311. In one embodiment, the gap is about ½ inch wide.

On the opposite side of the bladder 300 from the pipeline, the bladder 300 is contained by a form bladder housing 301 and a structural housing 306. A valve stem 303 passes through these housings to access the interior cavity of the bladder 300. Pressurized fluid is delivered through the valve stem 303 to the bladder, as described in more detail below, in order to inflate the bladder to grip the pipeline 307.

The bladder 300 is shown in the inflated position in FIGS. 14A-C. When the bladder 300 inflates, it radially reacts against the bladder housing 301 and structural housing 306, which are secured to a thrust head 309. These components are rigidly secured to the collar, and do not move when the bladder is inflated. Thus, when the bladder expands, it pushes against the shoe 302, thrust plate 304, and gripping surface 305. These components move inwardly until the gripping surface 305 contacts the pipeline 307, as shown at reference number 312. The bladder urges the gripping surface 305 against the outer surface of the pipeline 307, so that the gripping surface 305 firmly grips the pipe 307.

Each bladder 300 of the bladder assembly 320 (see FIG. 12) is extended to move the respective gripping surfaces 305 into contact around the circumference of the pipeline 307. Each gripping surface 305 extends a small distance along the circumference of the pipeline, and extends a longer distance, for instance 60 inches, along the axial length of the pipeline. The volume of fluid to inflate the bladders to grip the pipeline is approximately 75 cubic inches of fluid per diameter inch of pipeline 25.

To surround the pipeline, multiple individual bladders 300 and gripping surfaces are provided, as shown in FIG. 12. In one embodiment, the angular extent (as measured along the circumference of the pipe) covered by each bladder is small, such as less than 20°. Due to the short circumferential span of each bladder, the respective gripping surface can adjust to grip the curved outer surface of the pipeline without requiring precise alignment of all bladders. The bladders provide multiple contact points around the pipeline, providing a more uniform contact against the pipeline. This design facilitates the alignment of the bladders around the pipeline, and reduces the risk of damaging the pipeline or the outer coating of the pipeline due to a mis-orientation of a gripping shoe.

When the bladders are inflated and the gripping surfaces are contacting the pipeline, the collar 326 may be activated to thrust the pipeline forward or in reverse, as described above. When it is desired to release the pipeline from the collar, the bladders are deflated, and the gripping surfaces retract, as shown in FIGS. 13A-C. A spring 308 may be coupled between the thrust plate 304 and the thrust head 309 to bias the gripping surface 305 radially outwardly, away from the pipeline. The spring 308 assists in retraction of the gripping surfaces 305 away from the pipe.

A fluid metering system 400 for inflating and deflating the bladders 300 is shown in FIGS. 15A-B. The metering system 400 distributes the measured fluid volume that inflates the bladders 300. In FIG. 15A, the system is providing fluid flow to the bladders to inflate the bladders and grip the pipeline. The system 400 includes first and second hydraulic cylinders 401 and 402. The first cylinder 401 is a comparatively smaller-diameter, higher-pressure cylinder, which operates piston 405. In one embodiment, the first cylinder 401 has a diameter of about 4 inches, is about 30 inches long, and applies a pressure of about 2,000-3,000 psi. The second cylinder 402 is a comparatively larger-diameter, lower-pressure cylinder, which operates piston 407. In one embodiment, the second cylinder 402 has a diamter of about 12 inches, is about 30 inches long, and applies a pressure of about 300 psi. The two pistons are connected by a rod 406, which passes through a chamber 411. The vacant chamber 411 includes a vent 412 to vent the chamber according to movement of the pistons 405, 407, as described below.

In FIG. 15A, flow direction F, of high pressure fluid, fills cylinder chamber 403A in the first cylinder 401 (on the left side of the piston 405). The pressurized fluid within chamber 403A advances the piston 405 to the right, in the direction of arrow 404. The movement of the piston 405 also causes movement of the rod 406 and attached piston 407. The piston 407 moves through the vacant chamber 411 in the direction of arrows 404, causing the captured bladder fluid within chamber 408A in the second cylinder 402 to exit through a hose 409. The exiting fluid flow 410 passes through this hose 409 to the bladders 300 to inflate the bladders.

The system is operated in reverse in FIG. 15B. Flow direction F, of high pressure fluid, fills cylinder chamber 403B in the first cylinder 401 (on the right side of the piston 405). The pressurized fluid within chamber 403B advances the piston 405 to the left, in the direction of arrow 413. The movement of the piston 405 also causes movement of the rod 406 and attached piston 407 in the direction of arrows 413. This movement withdraws the reservoired fluid 408B from the bladders, by vaccuum effect, back into the cylinder 402, into the chamber 408. The reverse fluid flow is shown at arrow 414. This fluid 408A is withdrawn from the bladders, and with the combined effect of the retraction spring 308, the bladders retract the gripping surfaces away from the pipeline to release the collar from the pipeline.

In one embodiment, the system 400 is hydraulic, and the fluid 403, 408 is a liquid, such as treated water. In other embodiments the system may be pneumatic, and the fluid may be a gas. In other embodiments, the fluid 403 and the fluid 408 may be the same fluid, or may be different fluids.

In one embodiment, the system 400 may be provided with a measured amount of fluid such that each of the bladders are not inadvertently over-extended or over-filled. The amount of fluid needed to effectively grip the pipe is measured, and the system 400 provides that amount of fluid through the hose 409 to the bladders 300. The dual cylinders 401 and 402 enable inflation and deflation of the bladders to be accomplished rapidly, as the first cylinder 401 applies a small volume, high pressure and the second cylinder 402 applies a large volume, low pressure.

The system 400 provides a single fluid reservoir in the chamber 411 for all bladders 300. The single reservoir enables pressure equalization between the various bladders 300. In one embodiment, one large hydraulic main line 409 is provided, and smaller hydraulic hoses branch off from the main hydraulic line 409 and connect to the individual bladders.

The bladder assembly 320 and fluid distribution system 400 work together to actively grip or release the pipeline 307. The multiple individual bladders 300 each have a small profile, and can be distributed around the circumference of the pipeline with sufficient clearance around the pipeline. The bladders surround the pipeline to apply uniform gripping force against the pipeline from all directions, moving together inwardly and outwardly about a single axis (see FIG. 100). This uniform application of gripping force to the pipeline assists in maintaining the pipeline centered with respect to the two thrusting collar apparatus. When the bladders are retracted, additional rollers may be used to support the pipeline.

The pipe thruster embodiments described herein are particularly useful in a horizontal directional drilling system for installing transmission pipelines, such as pipelines for oil, gas, and water. In one embodiment, the pipeline installed has a diameter of about 30 inches or larger. Additionally, the pipe thruster may be used to drill the borehole itself, by thrusting a pipeline with an excavating drill head attached to the leading end of the pipeline. A motor at the front of the pipeline may be fed by hydraulic fluid to drive the drill head.

Although the present invention has been described and illustrated in respect to exemplary embodiments, it is to be understood that it is not to be so limited, since changes and modifications may be made therein which are within the full intended scope of this invention as hereinafter claimed.

What is claimed is:

1. A pipe thrusting apparatus for inserting and removing a pipe from a borehole, comprising:
    a first collar and a second collar each configured to expand and contract between a clamped position and a released position around the pipe;
    a support frame having at least one anchor securable to the ground;
    a first bi-directional driver coupled between the first collar and the support frame;
    a second bi-directional driver coupled between the second collar and the support frame; and
    wherein the first and second collars are configured to alternate between the clamped and released positions and to alternately move toward and away from the borehole to insert and remove the pipe from the borehole.

2. The pipe thrusting apparatus of claim 1, wherein the first bi-directional driver comprises at least one double-ended cylinder.

3. The pipe thrusting apparatus of claim 2, wherein the second bi-directional driver comprises a second pair of double-ended cylinders.

4. The pipe thrusting apparatus of claim 3, wherein each of the first pair of double-ended cylinders is mounted to the first collar and is attached at one end to a rear end of the support frame and coupled at an opposite end to the second pair of cylinders, and wherein each of the second pair of cylinders is mounted to the second collar and is attached at one end to a front end of the support frame and coupled at an opposite end to the first pair of cylinders.

5. The pipe thrusting apparatus of claim 1, further comprising first and second rollers on opposite sides of each of the first and second collars, wherein the first and second rollers are configured to roll along tracks in the support frame.

6. A pipe thrusting apparatus for inserting and removing a pipe from a borehole, comprising:
    a collar configured to releasably grip the pipe, the collar comprising a plurality of bladders circumferentially disposed around the collar, wherein the bladders are configured to move between inflated and deflated positions;
    a support frame; and
    a bi-directional driver coupled between the collar and the support frame, the driver configured to drive the collar toward and away from the borehole to insert and remove the pipe from the borehole.

7. The pipe thrusting apparatus of claim 6, further comprising a fluid metering system coupled to the plurality of bladders, the fluid metering system configured to inflate and deflate the bladders.

8. The pipe thrusting apparatus of claim 6, wherein the bladders have a major dimension extending parallel to the axis of the collar.

9. The pipe thrusting apparatus of claim 7, wherein the fluid metering system comprises a first hydraulic cylinder driving a second hydraulic cylinder, and wherein the diameter of the first hydraulic cylinder is smaller than the diameter of the second hydraulic cylinder.

10. The pipe thrusting apparatus of claim 6, wherein each of the bladders is coupled to a gripping shoe, and wherein each of the gripping shoes is configured engage the outer surface of the pipe when the bladder is in the inflated position.

11. The pipe thrusting apparatus of claim 6, wherein the collar comprises at least 10 bladders.

12. A pipe thrusting apparatus for inserting and removing a pipe from a borehole, comprising:
    a collar configured to releasably grip the pipe, the collar comprising:
        at least one active gripping shoe configured to move a first distance between an engaged position and a disengaged position; and
        at least one passive gripping shoe opposite the active gripping shoe, the passive gripping shoe configured to move a second distance between an extended position and a retracted position, wherein the second distance is smaller than the first distance;
    a support frame; and
    a bi-directional driver coupled between the collar and the support frame, the driver configured to drive the collar toward and away from the borehole to insert and remove the pipe from the borehole.

13. The pipe thrusting apparatus of claim 12, further comprising a hydraulic cylinder coupled to the at least one active gripping shoe, the hydraulic cylinder configured to drive the active gripping shoe between the disengaged position and the engaged position.

14. The pipe thrusting apparatus of claim 12, further comprising an eccentric pin or bushing connecting the at least one passive gripping shoe to the collar, wherein rotation of the eccentric pin or bushing between a first position and a second position drives the at least one passive gripping shoe between the extended position and the retracted position.

15. The pipe thrusting apparatus of claim 14, further comprising a mechanism for driving the eccentric pin or bushing between the first and second positions.

16. The pipe thrusting apparatus of claim 12, wherein the collar comprises an upper portion hingedly connected to a lower portion about a hinge, wherein the upper portion is configured to move between a closed position around the pipe and an open position for accessing the pipe.

17. The pipe thrusting apparatus of claim 12, wherein the collar comprises first and second upper portions and a lower portion, the first upper portion hingedly connected to one end of the lower portion and the second upper portion hingedly connected to an opposite end of the lower portion, wherein the first and second upper portions are configured to move between a closed position around the pipe and an open position for accessing the pipe.

18. The pipe thrusting apparatus of claim 12, further comprising:
an arm hingedly connected to the collar; and
a roller connected to the arm, the arm configured to rotate between a disengaged position and an engaged position above the at least one passive gripping shoe.

19. A pipe thrusting apparatus for inserting and removing a pipe from a borehole, comprising:
a collar configured to releasably grip the pipe;
a support frame;
an opening extending laterally through the support frame;
a fixed length crossbeam extending through the opening in the support frame and extending outward therefrom; and
a bi-directional driver coupled between the collar and the support frame, the driver configured to drive the collar toward and away from the borehole to insert and remove the pipe from the borehole.

20. The pipe thrusting apparatus of claim 19, further comprising a plurality of cleats on a lower surface of the support frame, the plurality of cleats engaging the ground and providing longitudinal stability.

21. A pipe thrusting apparatus for inserting and removing a pipe from a borehole, comprising:
a collar configured to releasably grip the pipe;
a support frame;
a bi-directional driver coupled between the collar and the support frame, the driver configured to drive the collar toward and away from the borehole to insert and remove the pipe from the borehole;
a crossbeam extending laterally across the support frame and extending outward therefrom;
at least one opening in the crossbeam, the crossbeam having a generally rectangular cross-section; and
at least one support member received in the at least one opening connecting the support frame to the ground.

22. The pipe thrusting apparatus of claim 21, wherein the at least one support member comprises a pile extending into the ground.

23. The pipe thrusting apparatus of claim 21, wherein the support member comprises a helical tension anchor configured to be placed in tension to draw the support member against the ground.

24. The pipe thrusting apparatus of claim 23, wherein the helical tension anchor comprises:
a shaft having an upper portion and a lower portion; and
at least one helical bearing plate extending a revolute angle around the shaft, the helical bearing plate having first and second ends longitudinally spaced along the shaft, wherein the at least one helical bearing plate is located along the lower portion of the shaft and the upper portion of the shaft is free of helical bearing plates.

25. The pipe thrusting apparatus of claim 24, wherein the revolute angle is approximately 360 degrees, and wherein the distance between the first and second ends is approximately 3 inches.

26. The pipe thrusting apparatus of claim 21, wherein the at least one support member comprises:
a piling having a longitudinal bore, a lower portion of the piling extending into the ground; and
a helical tension anchor received in the longitudinal bore, a lower portion of the helical tension anchor extending from the lower portion of the piling into the ground.

27. The pipe thrusting apparatus of claim 21, wherein the at least one support member comprises:
a piling having a longitudinal bore, a lower portion of the piling extending into the ground; and
a tension rod received in the longitudinal bore, a lower portion of the tension rod extending from the lower portion of the piling into the ground.

28. The pipe thrusting apparatus of 21, wherein the at least one support member comprises a plurality of pilings extending obliquely into the ground.

29. A pipe thrusting apparatus for inserting and removing a pipe from a borehole, comprising:
a collar configured to releasably grip the pipe;
a support frame, comprising:
a liftable thrust frame; and
an anchor platform,
wherein a front end of the liftable thrust frame is pivotally connected to a front end of the anchor platform and adjustable in angular relationship to a rear end of the anchor platform to align the pipe with the borehole;
a bi-directional driver coupled between the collar and the support frame, the driver configured to drive the collar toward and away from the borehole to insert and remove the pipe from the borehole; and
a crossbeam extending laterally across the support frame and extending outward therefrom.

30. A pipe thrusting apparatus for inserting and removing a pipe from a borehole, comprising:
a collar configured to releasably grip the pipe;
a support frame;
a bi-directional driver coupled between the collar and the support frame, the driver configured to drive the collar toward and away from the borehole to insert and remove the pipe from the borehole,
a sleeve extending laterally across the support frame; and
a crossbeam slidably received within the sleeve and extending laterally across the support frame and outward therefrom.

* * * * *